United States Patent [19]

Anderson

[11] Patent Number: 5,445,329
[45] Date of Patent: Aug. 29, 1995

[54] APPARATUS, SYSTEM FOR TREATING PROCESS MATERIAL SUCH AS WASTE MATERIAL

[76] Inventor: Joseph Anderson, 323 Stockbridge Ave., Atherton, Calif. 94027

[21] Appl. No.: 149,786

[22] Filed: Nov. 10, 1993

[51] Int. Cl.$^6$ ............................................. B02C 11/08
[52] U.S. Cl. ................... 241/65; 241/278.2; 34/129; 165/90; 237/67; 366/25; 366/147
[58] Field of Search ............... 241/47, 65, 57, 278.2, 241/220, 277; 366/227, 228, 27, 24, 25, 45, 59, 147; 34/43, 45, 57, 87, 90, 122, 127, 129, 138; 165/90, 89; 237/10, 67, 73

[56] References Cited

U.S. PATENT DOCUMENTS

| | | |
|---|---|---|
| 4,342,830 | 8/1982 | Holloway . |
| 4,540,495 | 9/1985 | Holloway . |
| 4,844,351 | 7/1989 | Holloway . |
| 4,974,781 | 12/1990 | Placzek . |
| 5,095,968 | 3/1992 | Didion ............................. 241/65 X |
| 5,119,994 | 7/1992 | Placzek . |
| 5,148,997 | 9/1992 | Gotoh et al. ......................... 241/65 |
| 5,190,226 | 3/1993 | Holloway . |
| 5,313,913 | 5/1994 | Ohshita et al. ...................... 122/4 D |

FOREIGN PATENT DOCUMENTS

WO93/6946 4/1993 WIPO .

Primary Examiner—Timothy V. Eley
Attorney, Agent, or Firm—Burns, Doane, Swecker & Mathis

[57] ABSTRACT

An apparatus for treating process material includes a vessel into which process material can be introduced, an arrangement for introducing steam into the interior of the vessel to heat and impart moisture to process material in the vessel, and several fluid transport conduits extending helically through the vessel for conveying heated fluid through the vessel between opposite ends of the vessel in order to raise the temperature and pressure within the vessel to treat the material while also allowing the moisture content of the process material to be reduced. The fluid transport conduits are also configured to contact the process material and assist in treating and densifying the material. The vessel can also be adapted to be pivoted so that the forward end of the vessel can be selectively positioned above and below a horizontal position. The vessel can also be interconnected with one or more similarly configured vessels to define a system for treating process material. The system can include an arrangement that allows steam and heat from a hot vessel to be conveyed to a cold vessel. A method for treating process material can include introducing process material into two different vessels, raising the temperature within one of the vessels through the introduction of steam to heat the material in the vessel, and reducing the temperature in the one vessel while also increasing the temperature in the other vessel by venting the interior of the one vessel to the interior of the other vessel.

24 Claims, 16 Drawing Sheets

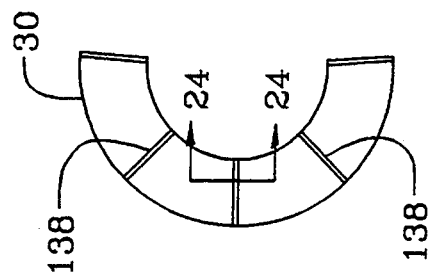
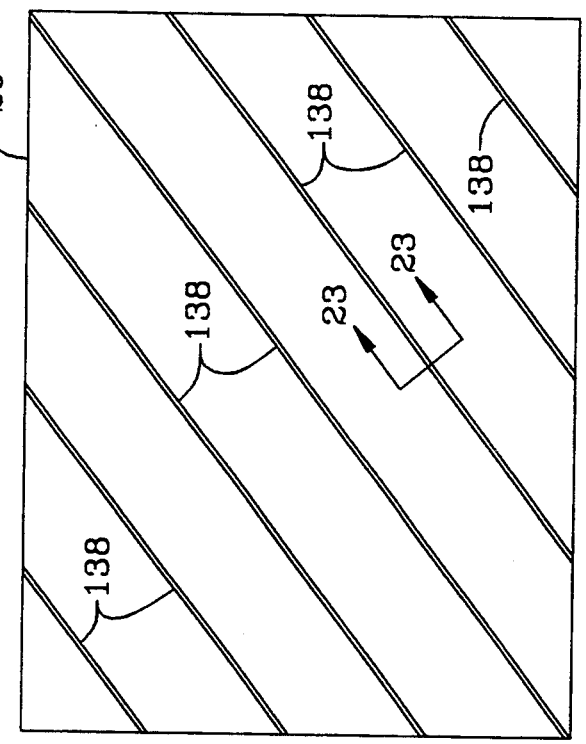
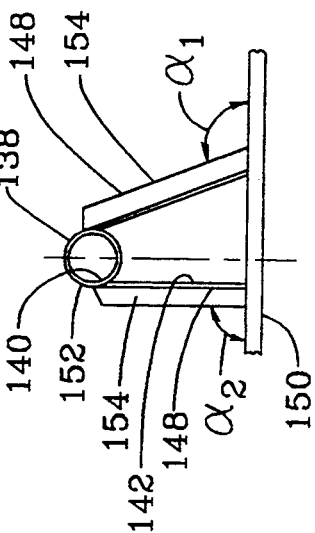
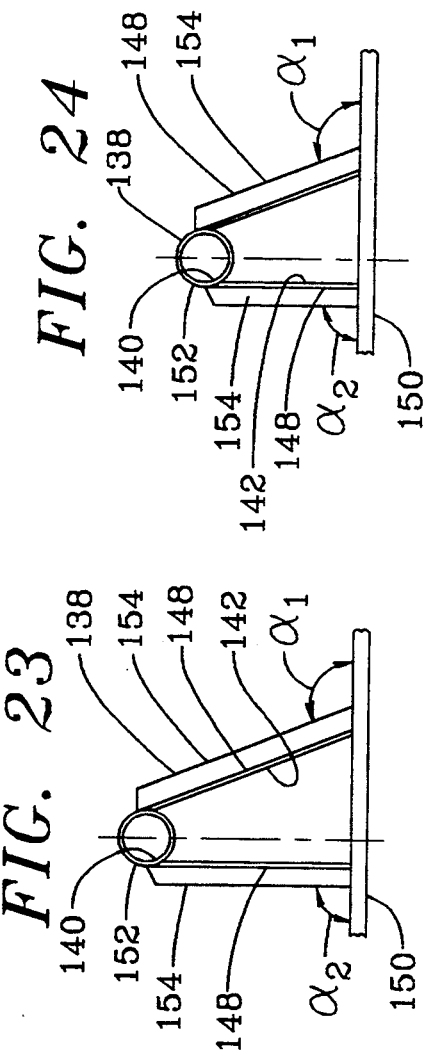
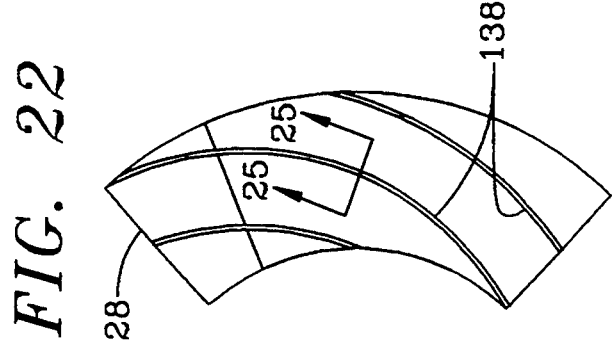
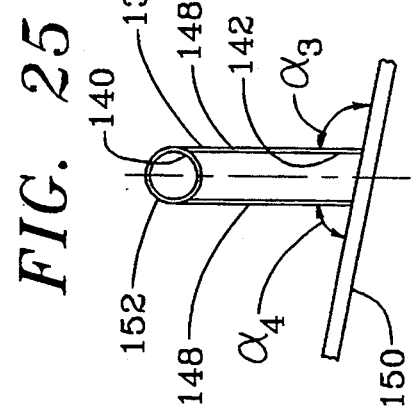

FIG. 27A

| No | Operation | Vessel A Operation |||||| Position of Valves |||||||||
|---|---|---|---|---|---|---|---|---|---|---|---|---|---|---|---|---|
| | | Time || Rotation || Angle | Press | Temp | Moist | Vessel A ||||| System ||
| | | Str | Fin | Dur | RPM | Dir | Artic | psi | °F | % | 1a | 1b | 2 | 3 | 4 | VB | VV | EV |
| 1 | LOADING & WETTING | 0 | 10 | 10 | 2 | L | 45 | AP | AMB | 40 | C | C | C | C | C | -10 | O | O |
| 2 | DOOR CLOSURE | 10 | 12 | 2 | S | - | 38 | AP | AMB | 40 | C | C | C | C | C | -10 | O | O |
| 3 | DEGASSING | 12 | 15 | 3 | 2 | L | 38 | AP | AM+ | 40 | O | C | O | O | O | -10 | O | O |
| 4 | PULPING & COND | 15 | 30 | 15 | 4 | U | 20± | AP | 200 | 48 | O | C | O | O | O | -10 | O | O |
| 5 | PULPING & HEATING | 30 | 40 | 10 | 8 | U | 12± | 45 | 275 | 48 | C | C | C | O | O | -10 | O | O |
| 6 | COOKING | 40 | 67 | 27 | 10 | U | 12± | 50 | 300 | 48 | C | C | C | O | O | -10 | O | O |
| 7 | VENTING & DRY | 67 | 85 | 18 | 8 | U | 30 | -5 | 170 | 35 | C | O | C | O | O | -5 | O | O |
| 8 | EXTRACTION & DRY | 85 | 95 | 10 | 4 | U | 12± | -10 | 150 | 28 | O | C | C | O | O | -10 | O | O |
| 9 | DOOR STORAGE | 95 | 97 | 2 | S | - | 12 | AP | 150 | 28 | C | C | C | C | C | -10 | O | O |
| 10 | LOWER & UNLOAD | 97 | 106 | 9 | 2 | U | -15 | AP | 150 | 28 | C | C | C | C | C | -10 | O | O |
| 11 | RAISE VESSEL | 106 | 108 | 2 | S | - | 45 | AP | - | - | C | C | C | C | C | -10 | O | O |
| 12 | ENGAGE MAKE-UP | 108 | 110 | 2 | S | - | 45 | AP | - | - | C | C | C | C | C | -10 | O | O |

Notes:

1. An articulation angle, ± indicates Vessell in automatic balancing mode and will search out optimal angle.
2. Temperature shown refers to the treated material in process.
3. Valve settings use C for closed, O for open.
4. Vacuum Breaker (VB) regulates air input in the process of cooling and drying.
5. With Rotation, L denotes loading direction, U unloading direction, and S stationary.
6. Moisture % indicated applies only to the biomass portion of the material.

FIG. 27B

| Vessel B | | | | | Angle | Press | Temp | Moist | Time | | | Rotation | | Operation | No. |
|---|---|---|---|---|---|---|---|---|---|---|---|---|---|---|---|
| 1a | 1b | 2 | 3 | 4 | VB | Artic | psi | °F | % | Str | Fin | Dur | RPM | Dir | | |
| C | C | C | 0 | 0 | C | 12± | 50 | 300 | 48 | 0 | 12 | 12 | 10 | U | COOKING – CONT. | 6 |
| C | 0 | C | 0 | 0 | -5 | 30 | -5 | 170 | 35 | 12 | 30 | 18 | 8 | U | VENTING & DRY | 7 |
| 0 | C | C | 0 | 0 | -10 | 12± | -10 | 150 | 28 | 30 | 40 | 10 | 4 | U | EXTRACTION & DRY | 8 |
| C | C | C | C | C | -10 | 12 | AP | 150 | 28 | 40 | 42 | 2 | S | – | DOOR STORAGE | 9 |
| C | C | C | C | C | -10 | -15 | AP | 150 | 28 | 42 | 51 | 9 | 2 | U | LOWER & UNLOAD | 10 |
| C | C | C | C | C | -10 | 45 | AP | – | – | 51 | 53 | 2 | S | – | RAISE VESSEL | 11 |
| C | C | C | C | C | -10 | 45 | AP | – | – | 53 | 55 | 2 | S | – | ENGAGE MAKE-UP | 12 |
| C | C | C | C | C | -10 | 45 | AP | AMB | 40 | 55 | 65 | 10 | 2 | L | LOADING & WETTING | 1 |
| C | C | C | C | C | -10 | 38 | AP | AMB | 40 | 65 | 67 | 2 | S | – | DOOR CLOSURE | 2 |
| 0 | C | 0 | 0 | 0 | -10 | 38 | AP | AM+ | 40 | 67 | 70 | 3 | 2 | L | DEGASSING | 3 |
| 0 | C | 0 | 0 | 0 | -10 | 20± | AP | 200 | 48 | 70 | 85 | 15 | 4 | U | PULPING & COND | 4 |
| C | C | C | 0 | 0 | -10 | 12± | 45 | 275 | 48 | 85 | 95 | 10 | 8 | U | PULPING & HEATING | 5 |
| C | C | C | 0 | 0 | -10 | 12± | 50 | 300 | 48 | 95 | 110 | 15 | 10 | U | COOKING | 6 |

APPARATUS, SYSTEM FOR TREATING PROCESS MATERIAL SUCH AS WASTE MATERIAL

FIELD OF THE INVENTION present invention relates generally to the treatment of process materials. More particularly, the present invention pertains to an apparatus, system and method for treating process materials of many different types through the use of heat and pressure.

BACKGROUND OF THE INVENTION

Landfills are commonly used to dispose of waste materials of many different types. These waste materials can include paper products, food scraps, yard waste, metal, glass, plastic and a host of other materials. In an attempt to reduce the amount of waste material that is deposited in landfills, source separating efforts in the form of recycling programs have been instituted. To the extent they are used, such recycling programs help reduce landfill dependence. However, it has been found that such recycling programs only result in the removal of a relatively small percentage of the total waste material. In the case of at least some material, such as paper products and others, the relatively small recovery rate can be attributed at least in part to the fact that a large percentage of the products are food-contaminated and thus quite difficult to separate and recycle.

Various proposals have been made in the past to treat waste material prior to its introduction into a landfill in an attempt to recover portions of the material and thereby reduce landfill dependence. However, generally speaking, those proposals have not been well received as they are not particularly suited for efficiently and effectively treating different types of waste materials such as those commonly found in municipal solid waste. Municipal solid waste is generally the most complex and mixed material occurring in waste streams. Thus, systems for effectively and efficiently treating municipal solid waste must be capable of treating and breaking down a wide range of different materials.

In addition to being not well suited for handling a wide range of materials, past proposals for treating waste material also suffer from other disadvantages and drawbacks. For example, some proposals require a supply of heated boiler quality water for heating the material being treated. The need for water of that quality significantly increases the cost and complexity of the treating facility. Moreover, the use of boiler quality water is quite needless since the water immediately becomes contaminated once it is introduced into the material being treated.

In addition, in situations in which the material being treated has been heated and saturated with hot water for purposes of breaking down the waste material, steam is employed in an attempt to dry the material to a specified degree. However, as might be expected, steam is not very well suited as a drying mechanism since it tends to introduce additional moisture into the material. Thus, past proposals have not been well suited to allowing the material to be dried to any desired degree. Moreover, little effort is made to recover the heat that is generated during the treatment process.

OBJECTS AND SUMMARY OF THE INVENTION

The present invention provides an apparatus, system and method for treating process material that are not susceptible to the same disadvantages and drawbacks as mentioned above. The present invention is well suited for effectively and efficiently treating materials of many different types, including municipal solid waste and oil contaminated soils. Organic and inorganic materials can be conditioned by varying treatment parameters, thereby facilitating sorting by size and density separation into their primary components, The present invention allows separation of food waste, ink, oil, grease and other related products from a host of base materials such as metal, glass and paper. Food products, for example, can be solubilized and then extracted from the waste stream. Additionally, a relatively clean, high quality form of cellulose can be recovered from the waste stream. It is also possible to obtain clean metal products (i.e., cans) which are much more readily acceptable as feedstock for various industries. Likewise, paper products can be treated to produce high quality recyclable material that can be separated for use in various industries. For example, through use of a fractionator, larger fibrous material can be divided out from the shorter fibrous material, with the former having possible use in the paper industry as recycled paper and the latter being used possibly in the electrical industry.

The present invention is also advantageous as it does not require boiler quality water to effectively treat the material. Indeed, through use of the present invention, it is possible to use relatively low quality water which is then extracted at the end of the treatment process as a relatively high quality water product.

It is possible to implement the present invention such that energy needs can be completely or at least partially supplied from the process fuels generated. For example, it is possible to use low pressure steam that is readily available from the cogeneration features of most electrical generating facilities which use steam or gas and seek low temperature application for their waste heat.

The present invention is also well suited for conserving and optimizing heat and water usage through use of a system of two or more vessels that are connected to one another in a way that allows steam vented from one vessel during a drying phase of operation to be conveyed to another vessel which is in a phase of operation requiring the addition of heat and moisture. In addition, the present invention allows the waste material being treated to be dried to a desired degree.

In accordance with one aspect of the present invention, an apparatus for treating process material through the use of heat and pressure includes a hollow vessel having a longitudinal axis and an interior for receiving process material to be treated. The vessel is provided with an opening that allows the introduction of process material to be treated into the interior of the vessel and at least one material contacting member secured to and extending inwardly from an inner surface of the vessel for contacting and mixing process material disposed in the interior of the vessel. A cantilevered shaft positioned centrally within the interior of the vessel is provided with at least one fin or vane for contacting and mixing process material in the interior of the vessel. A drive arrangement is provided for rotating the vessel in opposite directions about the longitudinal axis to cause the vessel and the material contacting member to rotate relative to the cantilevered shaft to impart a sheafing force to process material in the vessel in order to assist in breaking down the process material. In order to heat and impart moisture to process material in the vessel, an arrangement is provided for introducing steam into the interior of the vessel.

In accordance with another aspect of the invention, an apparatus for treating process material through use of heat and pressure includes a vessel having a longitudinal axis and an opening which communicates with an interior of the vessel for allowing process material to be introduced into the interior of the vessel, a removable door for closing the opening in the vessel, an arrangement for introducing steam into the interior of the vessel to heat and impart moisture to process material in the vessel, and at least one hollow fluid transport conduit positioned in the interior of the vessel for transporting heated fluid through the vessel between opposite ends of the vessel. The fluid transport conduit is preferably adapted to allow heated fluid to be conveyed through the vessel without coming into contact with process material in the vessel. The apparatus also includes a rotating device connected to the vessel for rotating the vessel in opposite directions about its longitudinal axis and a heated fluid supply arrangement connected to the fluid transport conduit for supplying heated fluid to the fluid transport conduit to cause an increase in the temperature and pressure within the interior of the vessel as the heated fluid flows through the fluid transport conduit and to dry process material located within the vessel.

Another aspect of the present invention involves a system for treating process material through the use of steam that includes: a first vessel having an interior and an opening for allowing process material to be introduced into the interior of the first vessel; a first steam supply line connected to the first vessel through which steam can flow into and from the interior of the first vessel; a second vessel having an interior and an opening for allowing process material to be introduced into the interior of the second vessel; and a second steam supply line connected to the second vessel through which steam can flow into and from the interior of the second vessel. Each of the first and second vessels is operable in a first operational mode and a second operational mode, and the system also includes an arrangement for allowing steam in the interior of the first vessel to be introduced into the interior of the second vessel when the first vessel is in the second operational mode and the second vessel is in the first operational mode, and for allowing steam in the interior of the second vessel to be introduced into the interior of the first vessel when the second vessel is in the second operational mode and the first vessel is in the first operational mode.

A further aspect of the present invention involves a method for treating process material. The method includes introducing a first batch of process material to be treated into the interior of a first vessel which has a longitudinal axis, rotating the first vessel about its longitudinal axis, raising the temperature within the interior of the first vessel, introducing a second batch of process material to be treated into the interior of a second vessel, reducing the temperature in the interior of the first vessel while also increasing the temperature in the interior of the second vessel by venting steam from the interior of the first vessel and introducing the vented steam into the interior of the second vessel, and emptying the first batch of process material from the first vessel.

In accordance with another aspect of the present invention, a method for treating process material through the use of heat and pressure includes introducing process material into the interior of a vessel having a longitudinal axis, increasing the moisture content of the material and increasing the temperature and pressure within the vessel to treat the process material, rotating the vessel about its longitudinal axis, reducing the temperature and pressure within the vessel by venting the interior of the vessel, reducing the moisture content of the process material in the vessel to a predetermined value by conveying a heated liquid through a fluid transport conduit which extends through the vessel, and removing the process material from the vessel after the moisture content of the process material has reached the predetermined value.

BRIEF DESCRIPTION OF THE DRAWING FIGURES

The foregoing features, in addition to others, will become more apparent from the detected description below considered in conjunction with the drawing figures in which like elements bear like reference numerals and wherein:

FIG. 20 is a plan view of a portion of the interior of the vessel illustrating the liquid transport conduits;

FIG. 21 is a plan view of a portion of the rearward end of the vessel illustrating the arrangement of the liquid transport conduits;

FIG. 22 is a plan view of a portion of the forward end of the vessel illustrating the arrangement of the liquid transport conduits;

FIG. 23 is a cross-sectional view of a liquid transport conduit taken along the section line 23—23 in FIG. 20;

FIG. 24 is a cross-sectional view of a liquid transport conduit taken along the section line 24—24 in FIG. 21;

FIG. 25 is a cross-sectional view of a liquid transport conduit taken along the section line 25—25 in FIG. 22;

FIGS. 27A and 27B are right and left sides respectively of a table setting forth the mode of operation of the system illustrated in FIG. 26 and a system which employs only a single vessel.

DETAILED DESCRIPTION OF THE PREFERRED EMBODIMENT

Figure 1:
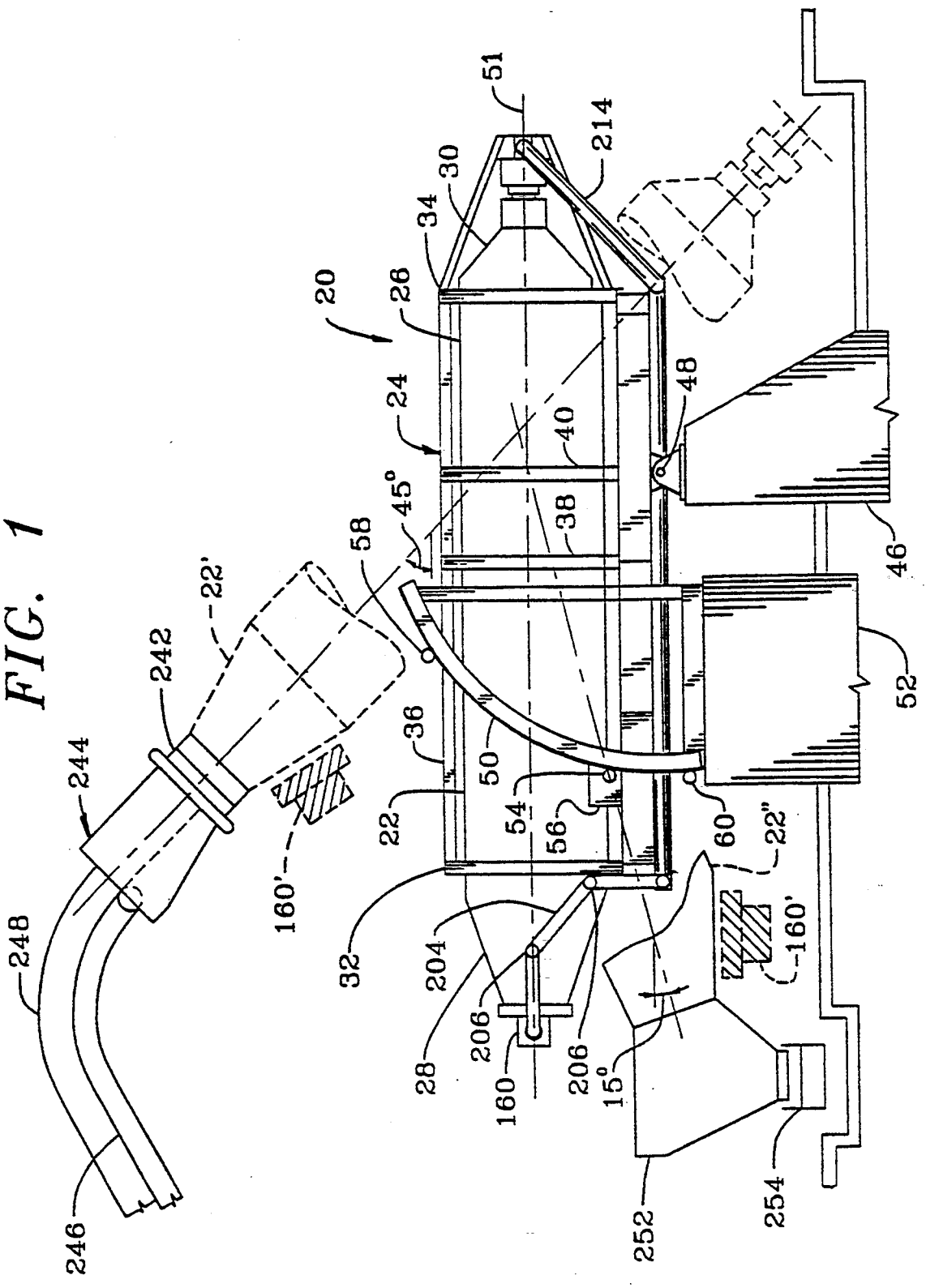
FIG. 1 is a side view of the apparatus according to the present invention illustrating the apparatus in various positions.

With reference initially to FIG. 1, the apparatus 20 according to a preferred embodiment of the present invention includes a vessel 22 that is fabricated of a stiff and rigid material (e.g., steel). The vessel 22 is mounted in a frame structure 24 and includes a generally cylindrically-shaped intermediate section 26 that is positioned between a front cone portion 28 located at a forward end of the vessel 22 and a rear cone portion 30 located at a rear end of the vessel 22.

Figure 3:
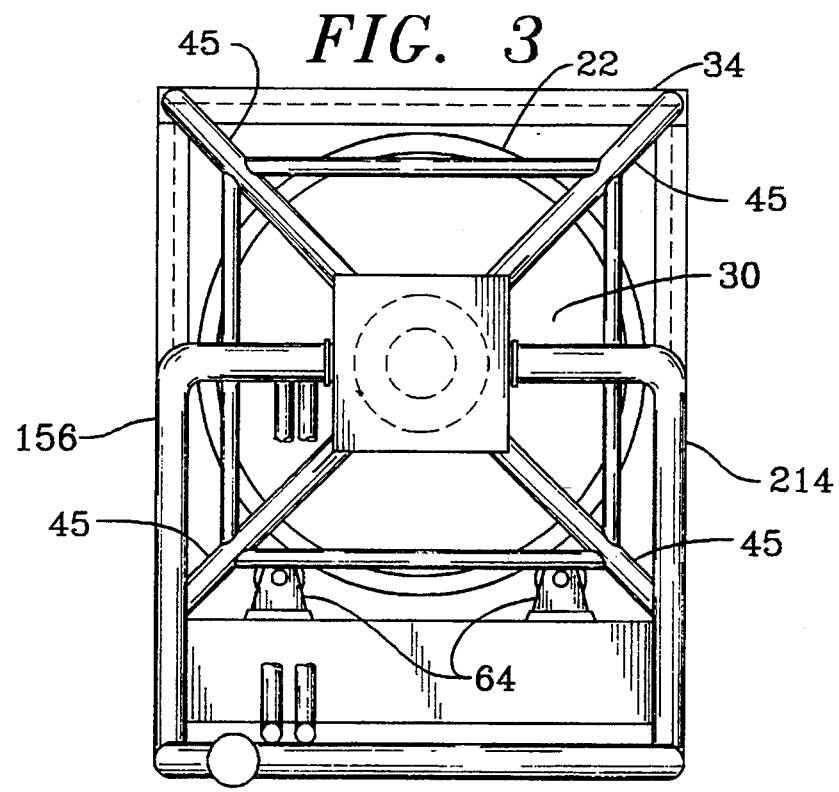
FIG. 3 is a rear end view of the apparatus as seen from the line 3—3 in FIG. 2.
Figure 5:
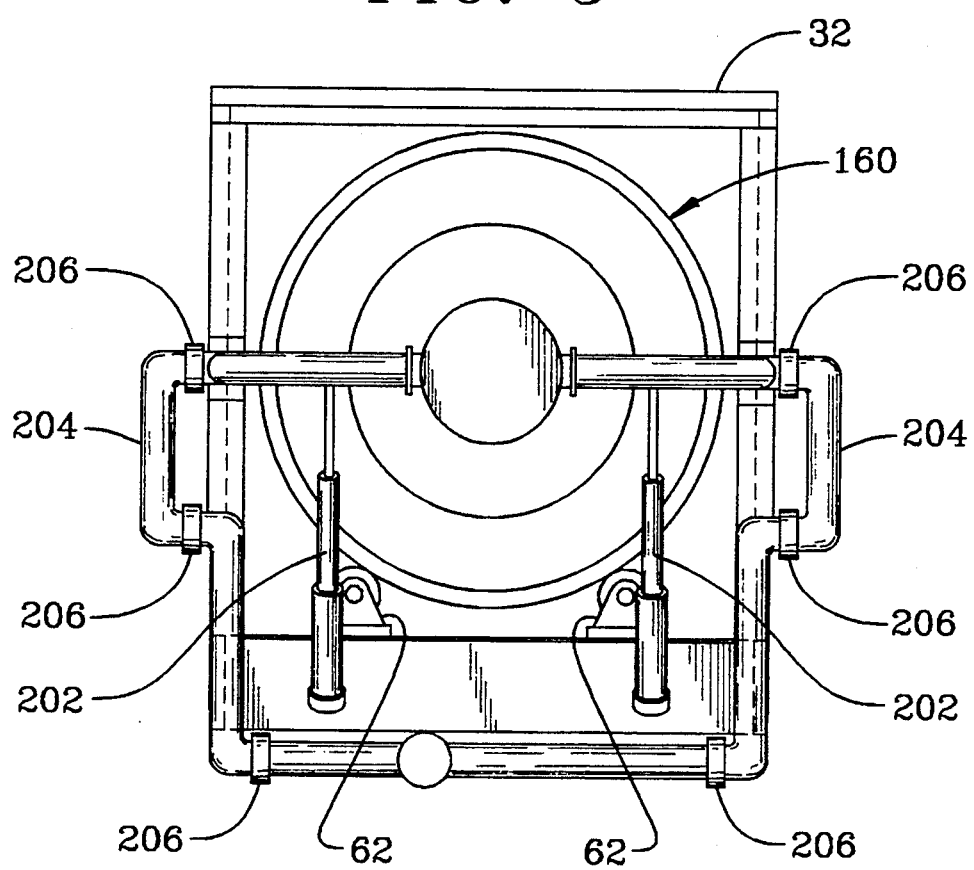
FIG. 5 is a front end view of the apparatus as seen from the line 5—5 in FIG. 2.

The frame structure 24 includes a forward supporting section 32 and a rearward supporting section 34 which are connected together by longitudinal supporting members 36 that extend between corresponding corners of the forward and rearward supporting sections 32, 34. As seen in FIGS. 3 and 5, the forward and rearward supporting sections 32, 34 are generally rectangular in shape (as seen from either end of the apparatus 20) and surround the opposite ends of the intermediate section 26 of the vessel 22.

Figure 2:
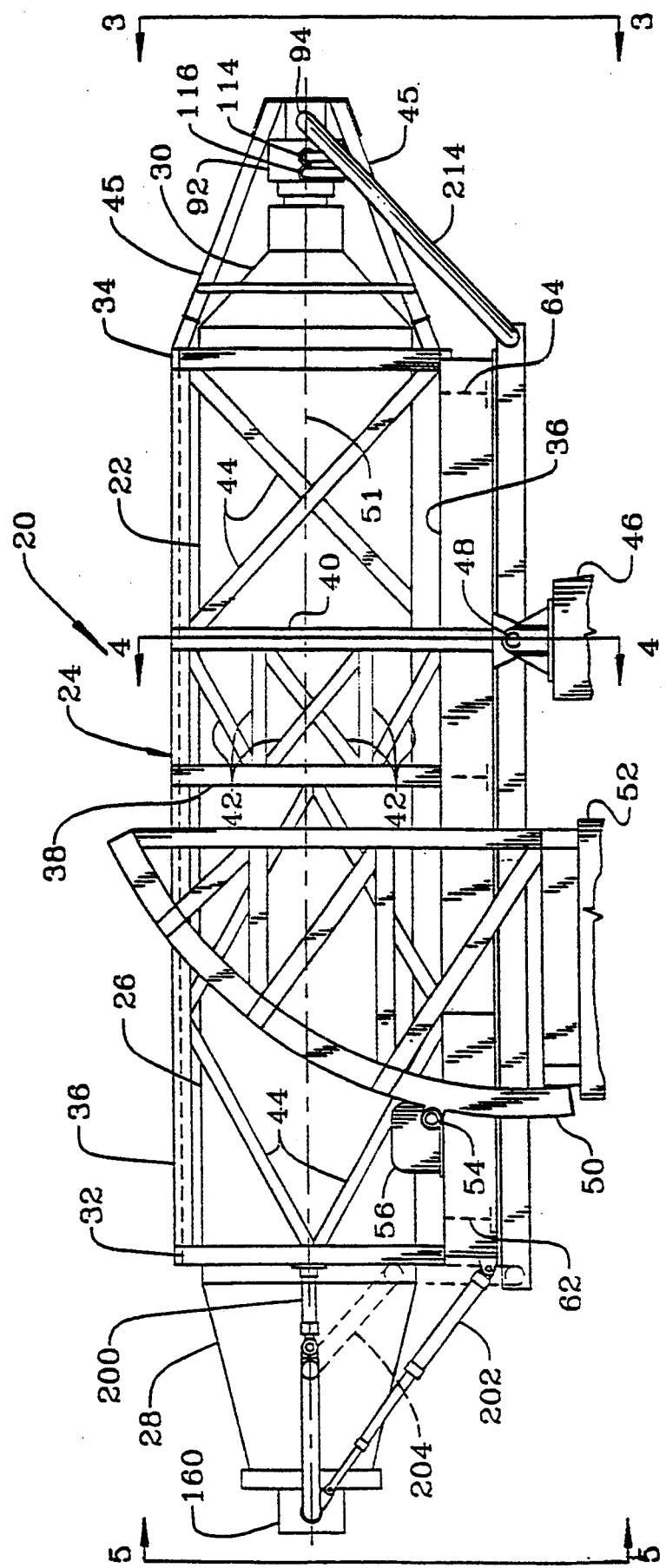
FIG. 2 is a slightly enlarged view of the apparatus shown in FIG. 1.

Located intermediate the length of the cylindrical intermediate section 26 of the vessel 22 are several additional supporting sections 38, 40 which are connected to one another by bracing members 42 as seen in FIG. 2. The additional supporting sections 38, 40 are also generally rectangular in shape (as seen from either end of the apparatus) and surround the intermediate section 26 of the vessel 22. Diagonally extending bracing members 45 are connected to the rearward supporting section 34 and serve to support the rearward end 30 of the vessel 22. Various other diagonally arranged bracing members 44 are also provided to stiffen and strengthen the frame structure 24 and help support the significant loads imposed by the vessel 22. The various bracing members 42, 44 are not illustrated in FIG. 1 for purposes of simplifying the illustration.

As seen in FIGS. 1 and 2, the frame structure 24 is pivotally mounted on a trunnion support 46 so that the frame structure 24 and the vessel 22 can pivot about a pivot axis 48. The pivot axis 48 is arranged transverse to the longitudinal axis 51 of the vessel 22.

With particular reference to FIG. 1 and as will be described below in more detail, the vessel 22 is movable between one position 22' (shown in dotted line configuration in FIG. 1) in which the forward end of the vessel is directed upwardly at an angle of approximately 45° with respect to the horizontal so that the forward end of the vessel 22 is positioned above the solid line horizontal position depicted in FIG. 1, and another position 22" (also shown in dotted line configuration in FIG. 1) in which the forward end of the vessel is directed downwardly at an angle of approximately 15° with respect to the horizontal so that the forward end of the vessel 22 is positioned below the solid line horizontal position shown in FIG. 1.

An arcuate rack 50 is mounted on a supporting element 52 for interacting with a pinion 54. The pinion 54 is driven by a motor 56 which is secured to the frame structure 24. Thus, during operation of the motor 56, the pinion 54 moves along the rack 50 to cause the frame structure 24 and the vessel 22 to pivot about the pivot axis 48. A stop 58 is provided on the rack 50 to limit the pivoting movement of the vessel 22 in the clockwise direction while another stop 60 is positioned on the rack 50 to limit pivoting movement of the vessel 22 in the counterclockwise direction.

With reference to FIGS. 2, 3 and 5, the vessel 22 is supported on the frame structure 24 by way of a first pair of vessel supports 62 located towards the forward end of the vessel 22 and a second pair of vessel supports 64 located near the rearward end of the vessel 22. The vessel supports 62, 64 support the vertical loads imparted by the vessel 22 and transmit those vertical loads to the frame structure 24. The two supports forming each pair of supports 62, 64 are preferably spaced apart so that they subtend an angle of about 70°.

Figure 6:
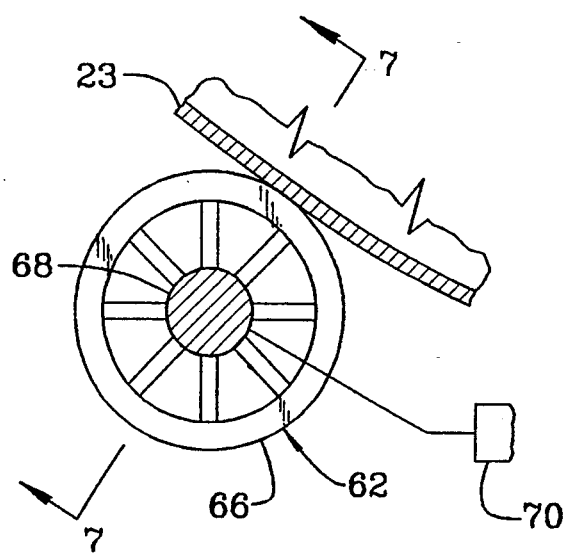
FIG. 6 is a cross-sectional view illustrating the vessel supports used to support the vessel.
Figure 7:
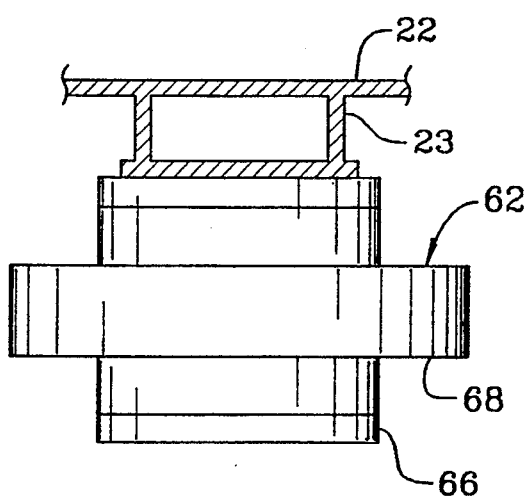
FIG. 7 is a cross-sectional view of the vessel support and supporting bracket taken along the section line 7—7 in FIG. 6.

Each of the vessel supports 62, 64 is comprised of a freely rotatable flat wheel 66 that is mounted on a shaft 68 as seen in FIG. 6. Although FIG. 6 illustrates the construction of the vessel supports 62 located towards the forward end of the vessel 22, it is understood that the construction of the vessel supports 64 located towards the rearward end of the vessel 22 is substantially the same. An annular supporting bracket 23 is provided on the outer periphery of the vessel 22 at the axial locations corresponding to the vessel supports 62, 64. Preferably, the brackets 23 extend around the entire outer periphery of the vessel 22. The supporting brackets 23 rest upon the freely rotatable wheels 66 so that the vessel 22 is supported in the forward and rearward regions by way of the vessel supports 62, 64. During operation, the vessel 22 experiences thermal expansion and contraction in a direction along the longitudinal axis of the vessel (i.e., the vessel expands in length). The use of support wheels 66 which have a flat outer circumferential surface is advantageous as they allow that thermal expansion and contraction to occur in an unrestrained manner.

Each of the vessel supports 62, 64 is also provided with a load sensor 70, which can be in the form of strain gauge instrumentation, for measuring the live load distribution within the vessel 22. As will be described in more detail below, input from the sensors 70 is used to effect an approximate equal distribution of the material located in the vessel during the treatment operation. That is, input from the sensors 70 is used to control the angle of inclination of the vessel 22 through suitable operation of the motor 56. Thus, if the sensor 70 associated with the front vessel support 62 detects a load significantly greater than the sensor 70 associated with the rear vessel support 64, the motor 56 is appropriately operated to raise the vessel 22 and thereby cause the material in the vessel 22 to move towards the rear cone portion 30 of the vessel 22.

Figure 4:
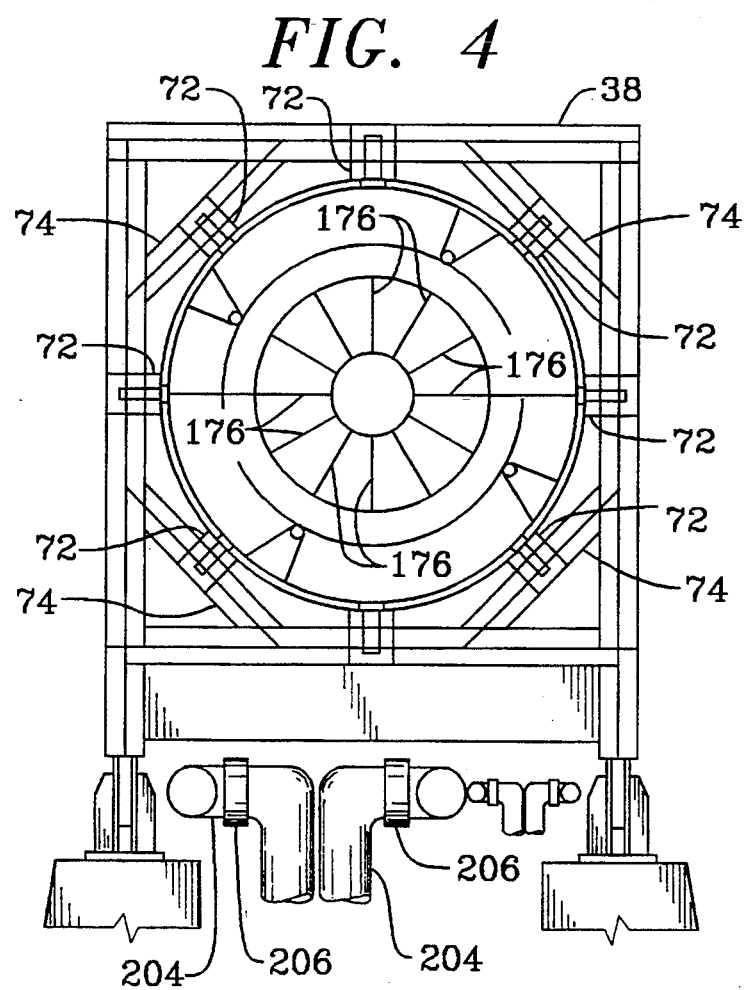
FIG. 4 is a cross-sectional view of the apparatus taken along the section line 4—4 in FIG. 2.

The frame structure 24 is also provided with a plurality of longitudinal thrust bearings 72. As seen in FIG. 4, the preferred embodiment of the present invention includes eight longitudinal thrust bearings 72, four of which are mounted on the supporting section 40 and four of which are mounted on diagonally oriented mounts 74. The longitudinal thrust bearings 72 help prevent movement of the vessel 22 in a direction along the longitudinal axis of the vessel. In addition, the longitudinal thrust bearings 72 support longitudinal loading along the longitudinal axis of the vessel 22 and transfer such loading to the frame structure 24 when the vessel 22 is in a position other than the horizontal position.

Figure 8:
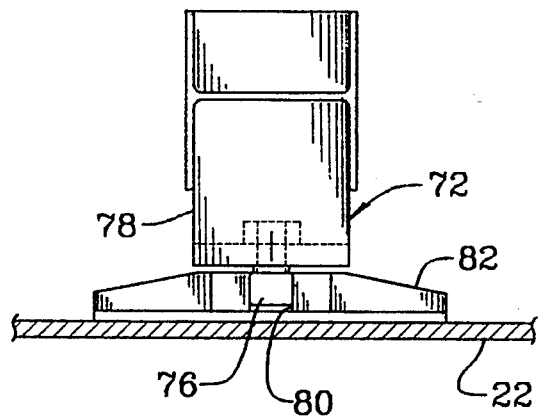
FIG. 8 is a side view of the longitudinal thrust bearing that is used to support the vessel.
Figure 9:
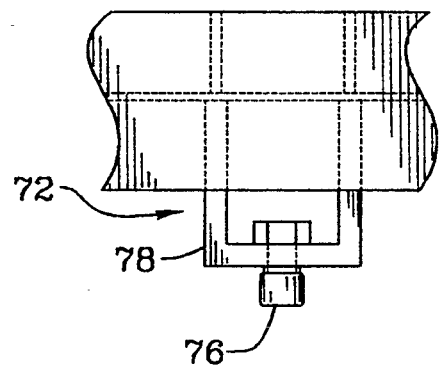
FIG. 9 is a front view of the longitudinal thrust bearing shown in FIG, 8.

As shown in more detail in FIGS. 8 and 9, each of the longitudinal thrust bearings 72 includes a roller 76 that is freely rotatable about an axis directed generally towards the longitudinal axis of the vessel 22. Each freely rotatable roller 76 is appropriately secured to a mounting bracket 78 which is attached to one of the mounts 74 or the supporting section 40. An annular guide 82 extends around the entire outer peripheral surface of the vessel 22 and is provided with an annular groove 80 that receives the respective rollers 76. In that way, the vessel 22 is free to rotate about its longitudinal axis, yet is prevented from substantially moving in the direction along the longitudinal axis of the vessel 22. Preferably, the longitudinal thrust bearings 72 are also designed to accommodate expansion and contraction of the vessel 22 during operation.

Figure 10:
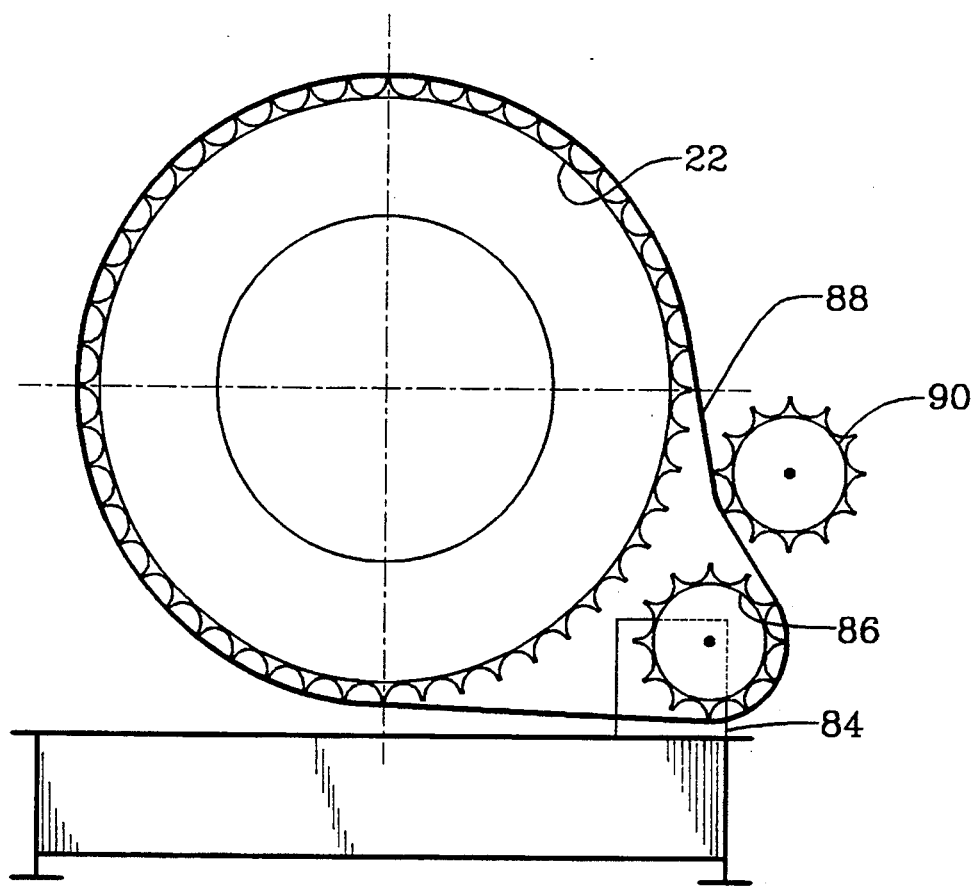
FIG. 10 is a side view of the drive mechanism for rotating the vessel.

One possible arrangement for rotatably driving the vessel 22 about its own longitudinal axis is illustrated in FIG. 10 and includes a motor 84 for driving a shaft that is connected to a toothed wheel 86. An endless chain or belt 88 extends around the toothed wheel 86 as well as around the outer periphery of the vessel 22. The outer periphery of the vessel 22 can be suitably configured as illustrated in FIG. 10 in order to interact with the endless chain or belt 88. Thus, operation of the motor causes rotation of the toothed wheel 86, thereby resulting in movement of the endless chain or belt 88 and rotation of the vessel 22. The motor 84 is adapted to be driven in opposite directions to effect rotation of the vessel 22 in opposite directions about its longitudinal axis. A weighted tension sprocket 90 is also provided to maintain a suitable degree of tension in the endless chain or belt 88. Although not specifically shown in FIGS. 1 and 2, the endless chain or belt 88 is preferably located relative to the length of the vessel 22 at a position that corresponds to the supporting section 38. Thus, the rotary drive arrangement is located at substantially the longitudinal midpoint of the vessel 22 to thereby avoid imparting eccentric movement to the vessel 22 during operation of the rotary drive arrangement. Additionally, the supporting section 38 provides structural support for the rotary drive arrangement.

As an alternative to the arrangement shown in FIG. 10, the rotary drive arrangement for the vessel 22 can take the form of a radial rack and pinion device. Such a rack and pinion device could be provided with a series of limit switches for slowing the rotation of the vessel 22 in steps when the direction of rotation of the vessel 22 is changed or when the rotation of the vessel 22 is to be stopped. In some instances, a rack and pinion rotary drive arrangement may be useful insofar as providing a relatively precise stop location for stopping rotation of the vessel. The ability to provide a more precise stop location may be beneficial with respect to, for example, positioning the front cone portion 28 of the vessel in the manner necessary for properly fitting the autoclave door 160, which will be described in more detail below.

Figure 13:
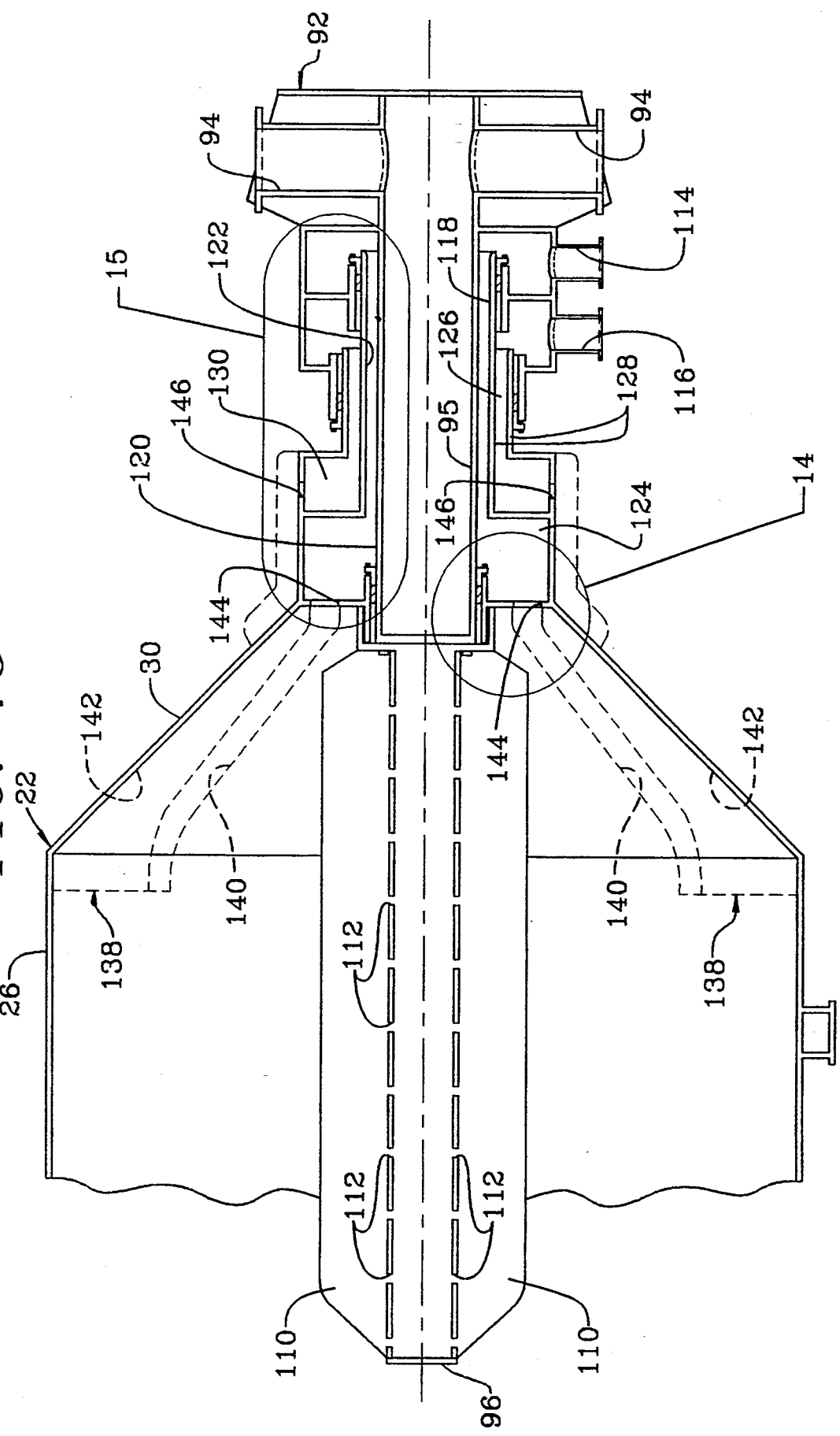
FIG. 13 is an enlarged top view of the rearward end of the vessel according to the present invention.
Figure 19:
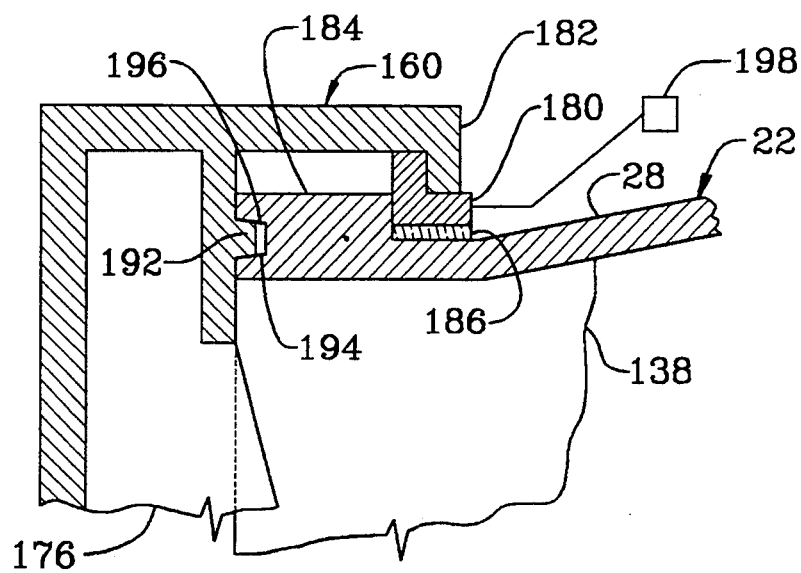
FIG. 19 is an enlarged view of the detail designated 19 in FIG. 16.

With reference to FIG. 13, a manifold 92 is attached to the rearward end 30 of the vessel 22. The manifold 92 includes two oppositely positioned steam supply inlets 94 through which steam can be directed so as to be introduced into the interior of the vessel 22. The steam supply inlet 94 is connected to a centrally disposed conduit 94 of the manifold 92 which fluidly communicates with a hollow shaft 96. The hollow shaft 96 is fixed to the manifold 92 and extends in a cantilever fashion into the interior of the vessel 22. The cantilever shaft 96 extends into the interior of the vessel 22 only for a portion of the longitudinal extend of the vessel 22 (e.g., between fifteen and twenty-five percent of the total length of the vessel 22).

Figure 14:
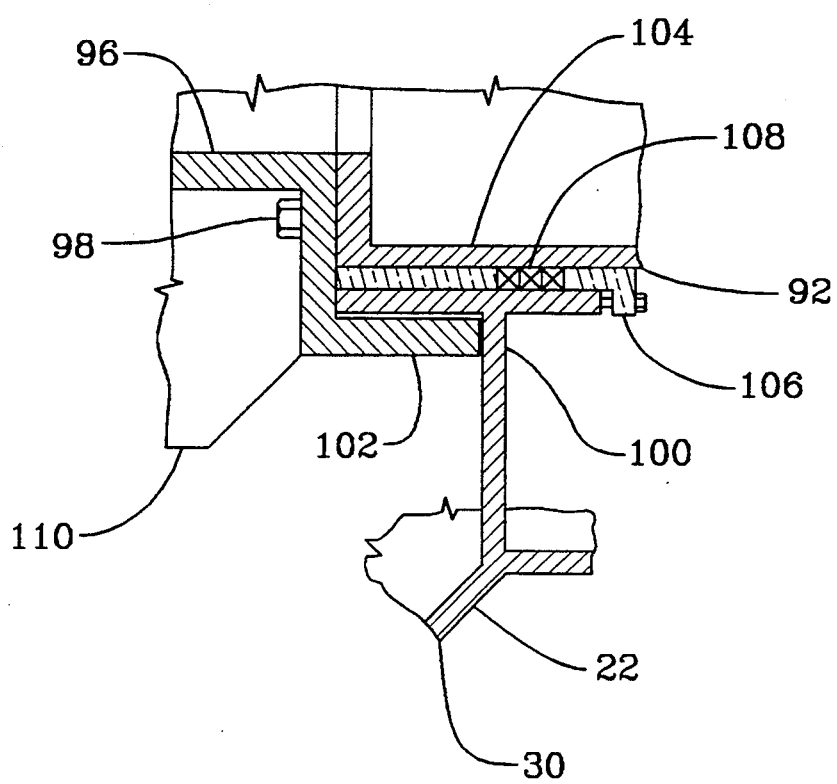
FIG. 14 is an enlarged view of the detail designated 14 in FIG. 13.

As can be seen with reference to FIG. 14, which is a detailed view of the portion of FIG. 13 designated 14, the shaft 96 is secured to the manifold 92 by way of a suitable securing device 98. A radially extending rib 100 on the rearward end of the vessel 22 is positioned between an annular shoulder 102 of the shaft 96 and an end portion 104 of the manifold 92. A suitable gland or bearing 106 is positioned between the rib 100 of the vessel 22 and the end portion 104 of the manifold 92. Suitable packing 108 can also be provided to effect fluid-tightness.

With reference once again to FIG. 13, the cantilevered shaft 96 is provided with several radially outwardly directed fins 110 whose purpose will be explained in more detail below. In addition, the shaft 96 is provided with a plurality of spaced apart openings or jets 112 that communicate with the hollow interior of the shaft 96. In that way, steam supplied to the inlets 92 flows through the centrally disposed conduit 95 and to the hollow shaft 96 where it is introduced into the interior vessel 22 by way of the openings or jets 112 in the shaft 96. Steam can be supplied to the inlets 92 by way of a steam supply line 214 as seen in FIGS. 1, 2, 3, 11 and 12.

Additionally, the manifold 92 is fixed with respect to the vessel 22 so that the manifold 92 remains stationary during rotational movement of the vessel 22. As can be seen with reference to FIGS. 1, 2 and 12, the manifold 92 is held in a fixed and stationary position by way of the diagonally oriented bracing elements 45.

The manifold 92 is also provided with a liquid supply inlet 114 and a liquid return outlet 116. The liquid supply inlet 114 fluidly communicates with an annular fluid supply channel 118 formed between the outer surface 120 of the centrally disposed conduit 95 of the manifold 92 and the inner surface 22 of the cylindrical end portion of the vessel 22. The annular fluid supply channel 118 opens into an enlarged annular chamber portion 124 which communicates with several fluid transport conduits 138.

The liquid return outlet 116 is in fluid communication with an annular fluid return channel 126 which is defined between two longitudinally extending, generally cylindrical extensions 128 at the rearward end 30 of the vessel 22. The annular fluid return channel 126 opens into an annular chamber portion 130 which also communicates with the fluid transport conduits 138.

Figure 15:
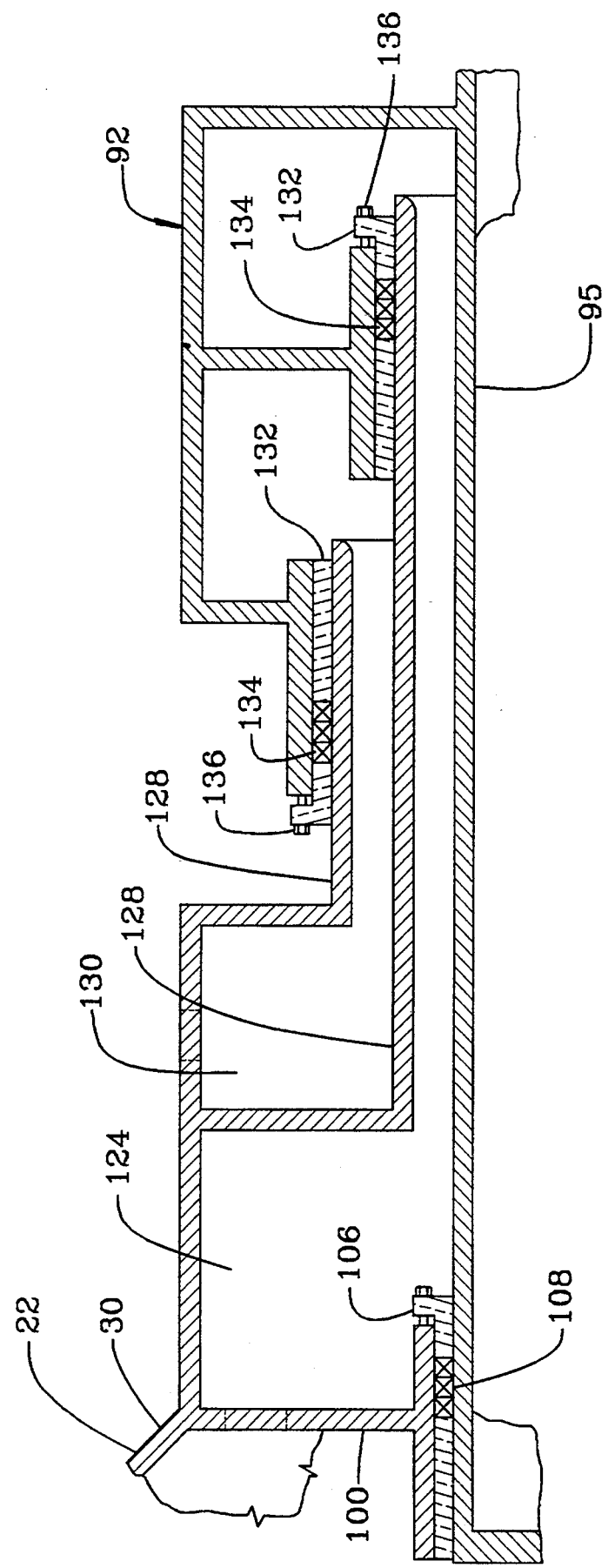
FIG. 15 is an enlarged view of the detail designated 15 in FIG. 13.

Details concerning the way in which the manifold 92 is secured to the rearward end 30 of the vessel 22 can be seen with reference to FIG. 15. The cylindrical extensions 128 at the rearward end 30 of the vessel 22 each have glands or beatings 132 secured thereto. The glands or bearings 132 are provided with a packing 134 to assist in providing a liquid and airtight fit. A suitable securing or fastening mechanism 136 is associated with each of the glands or bearings 132. Through use of the fastening mechanisms 136, the manifold 92 can be secured in place on the rearward end 30 of the vessel 22.

As noted above and as seen with reference to FIG. 13, the annular chamber portions 124, 130 fluidly communicate with what are generally termed as fluid transport conduits 138. As seen more particularly in FIGS. 20-22, each of the liquid transport conduits 138 includes a liquid supply conduit 140 and a liquid return conduit 142. The liquid supply conduit 140 fluidly communicates with the annular chamber 124 as seen in FIG. 13 by way of a through-hole 144 provided in the wall at the rear cone portion 30 of the vessel 22. Likewise, the liquid return conduit 142 fluidly communicates with the annular chamber 130 by way of a through-hole 146 provided in the wall at the rear cone portion 30 of the vessel 22. In that way, liquid which is supplied to the inlet 114 in the manifold 92 will flow into the liquid supply conduit 140, and liquid in the liquid return conduit 142 will flow into the liquid return outlet 116.

FIGS. 20-22 are plan views of the inner surface of the intermediate section 26 of the vessel, the rear cone portion 30 of the vessel and the front cone portion 28 of the vessel, respectively. In the preferred embodiment of the present invention, four fluid transport conduits 138 are provided in the vessel 22 and are appropriately fixed to the interior surface of the vessel 22. One function served by the fluid transport conduits 138 is to transport heated fluid through the interior of the vessel 22 in order to heat and/or dry the material located in the vessel. Oil is the preferred fluid as it can be heated to a higher temperature than other liquids (e.g., water) without creating excessive pressure.

In the intermediate section 26 of the vessel 22 as shown in FIG. 20, each of the fluid transport conduits 138 extends helically through the vessel. Preferably, each one of the fluid transport conduits 138 makes a single complete 360° helical revolution between opposite ends of the intermediate section 26 of the vessel 22. Of course, the fluid transport conduits 138 can be designed to complete more or less than one revolution within the interior of the intermediate section 26 of the vessel 22.

As seen in FIGS. 20-22, each of the fluid transport conduits 138 can be defined by two plates 148 that are each secured to the inner surface of the vessel wall 150 in any suitable manner. The two plates 148 project inwardly towards the interior of the vessel 22 and are joined to one another by a pipe-section 152 having a generally circular cross-section. Thus, the space defined by the two plates 148 and the pipe 152 constitute the liquid return conduits 142 while the hollow interior of the generally circular pipe 152 constitutes the liquid supply conduits 140.

The fluid transport conduits 138 act as a pressure plenum for the heat transfer medium and also provide significant stiffening to the wall 150 of the vessel. In the intermediate section 26 and the rearward cone section 30 of the vessel 22, the plates 148 are preferably provided with heat transfer fins 154 which help facilitate the transfer of heat to the interior of the vessel and the material located in the vessel. The fins 154 also help agitate and condition the material through direct physical contact with the material.

Preferably, the fluid transport conduits 138 are designed to transport fluid from the rear cone portion 30 to the forward end of the intermediate section 26. That is, the portion 138' (see FIG. 22) of each fluid transport conduit 138 located in the front cone portion 28 is preferably not in fluid communication with the respective remaining portion of the fluid transport conduit 138. Thus, each of the fluid transport conduits 138 is designed to transport heated fluid through the rear cone section 130 and the intermediate section 126, but not through the front cone section 128. Thus, within the front cone section 28 of the vessel 22, the fluid transporting member 138 serves the primary function of a material contacting member.

For each fluid transport conduit 138, the liquid supply conduit 140 and the liquid return conduit 142 are entirely separate from one another except at the forward end of the intermediate section 26 of the vessel 22 (i.e., the end of the intermediate section 26 adjacent the forward cone section 28). At the forward end of the intermediate section 26 of the vessel 22, the liquid supply conduit 140 is in fluid communication with the liquid return conduit 142. Thus, heated fluid supplied to the liquid supply inlet 114 flows from the rear cone section 30 of the vessel 22 to the forward end of the intermediate section 26 of the vessel 22 by way of the liquid supply conduit 140. Upon reaching the forward end of the intermediate section 26, the heated fluid flows into the liquid return conduit 142 where it flows back towards the rear cone section 30 of the vessel 22 and is discharged by way of the liquid return outlet 116. The liquid supply conduit 140 and the liquid return conduit 142 are specifically designed so that fluid flowing therethrough remains separate from and does not contact the material in the vessel 22.

As noted above, within the intermediate section 26 of the vessel 22, the fluid transport conduits 138 extend in a helical manner. In the rearward cone section 30 of the vessel 22, the fluid transport conduits 138 are arranged as short helices in order to help expedite the initial breakdown of the material during filling of the vessel. In the forward cone section 28 of the vessel 22, the fluid transport conduits 138 extend in a generally helical manner, although somewhat differently than in the intermediate section 26, in order to assist the unloading movement of the materials from the vessel.

As can be seen in FIGS. 23 and 24, in the intermediate section 26 and the rear cone section 30 of the vessel 22, the plates 148 which define the liquid return conduits 142 are arranged with respect to the vessel wall 150 to form an angle $\alpha_1$ of approximately 115° on the rearward end side and an angle $\alpha_2$ of approximately 90° with respect to the forward end side. As will become apparent from the description below, such a disposition of the plates 148 is advantageous in assisting movement of the material within the vessel 22 during rotation of the vessel. In addition, the arrangement and disposition of the fluid transport conduits 138 within the intermediate section 26 is designed to achieve significant cascading and lifting of the material within the vessel 22, and less longitudinal movement, thereby resulting in optimum tumbling. Also, the inclination of the plates 148 on the rearward end side helps compress, but preferably not lock, the material as the material is being loaded into the vessel.

As seen in FIG. 25, within the front cone section 28, the plates 148 can form an angle $\alpha_3$ of 110° with respect to the vessel wall 150 at the rearward end side and an angle $\alpha_4$ of 70° with respect to the vessel wall 150 on the forward end side. The arrangement and disposition of the material contacting member 138' as shown in FIGS. 22 and 25 serves to facilitate the unloading of the material from the interior of the vessel by counteracting the additional lift that results from the way in which the wall of the front cone section 28 converges towards the center line of the vessel 22.

Figure 16:
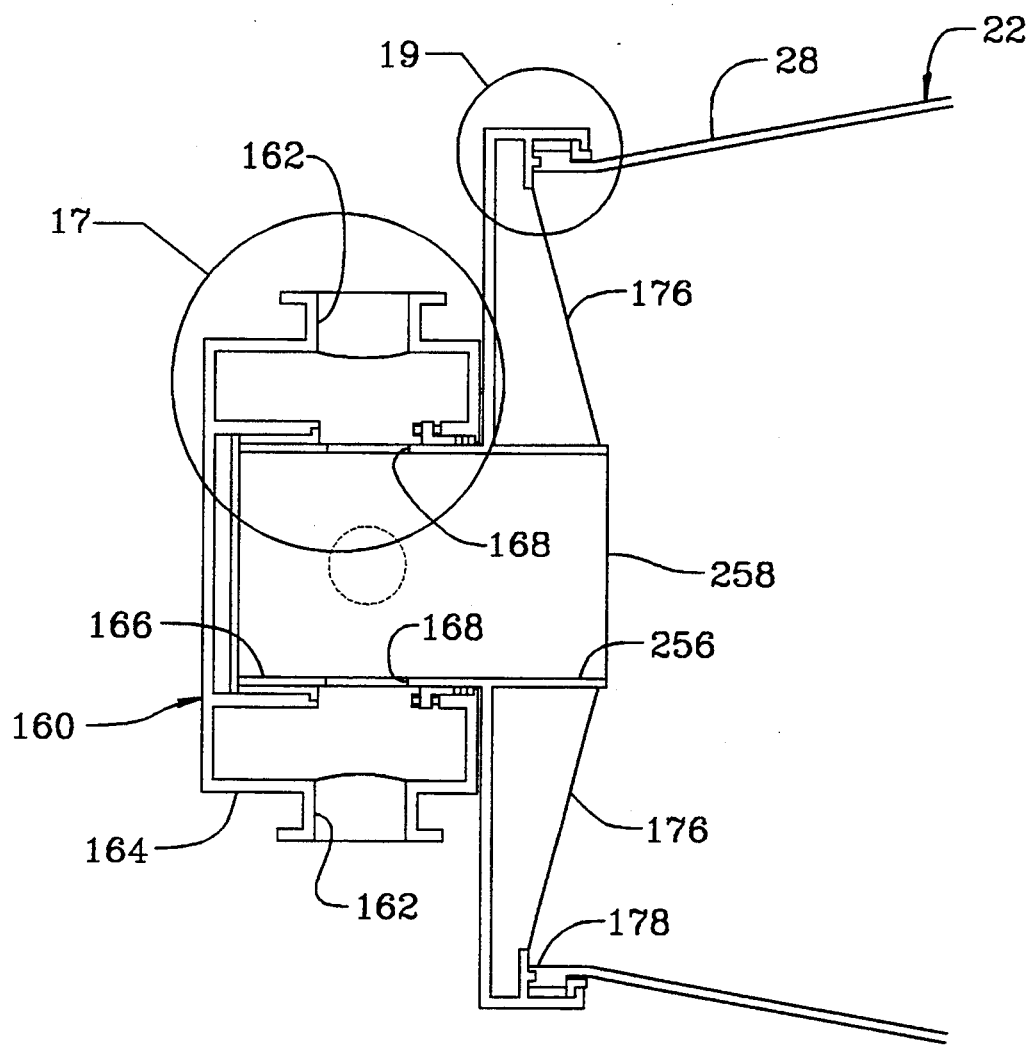
FIG. 16 is an enlarged view of the autoclave door that is attached to the forward end of the vessel in accordance with the present invention.

As will be described in more detail below, during operation of the vessel 22, steam is vented out of the vessel by way of steam outlets 162 provided in a removable door 160 that is attached to the front cone portion 28 of the vessel 22 as illustrated in FIG. 16. The door 160 includes a manifold portion 164 that fits over a centrally located cylindrical hub portion 166. The cylindrical hub portion 166 is provided with four oppositely positioned openings 168 (only two of which are shown in FIG. 16) that communicate with the oppositely positioned steam outlets 162.

Figure 17:
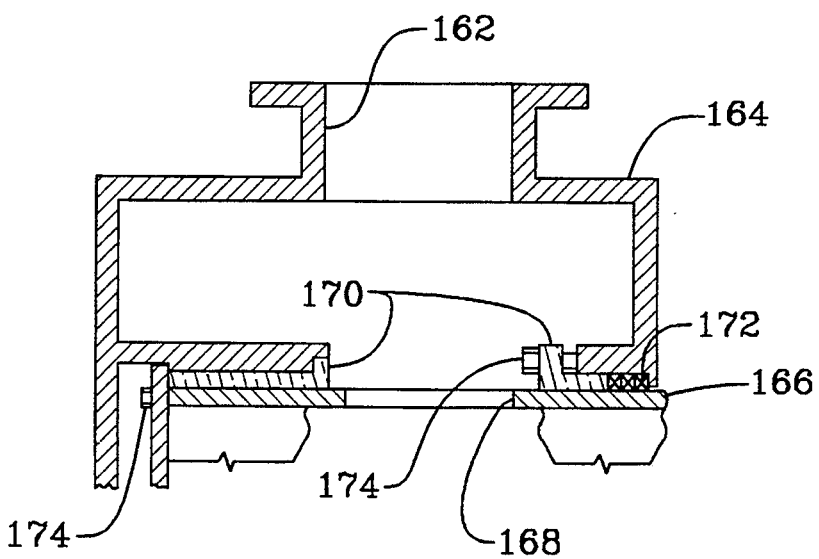
FIG. 17 is an enlarged view of the detail designated 17 in FIG, 16.

As seen more clearly in the detail of FIG. 17, the manifold portion 164 is fixed to the cylindrical hub portion 166 by way of several glands or bearings 170 that can be attached to the cylindrical hub portion 168. A packing 172 can also be provided to help effect a liquid and watertight seal. Appropriate fastening or securing devices 174 are also provided to properly situate and fix the manifold portion 164 on the cylindrical hub portion 166.

Additional features associated with the door will become more apparent with reference to FIG. 16 and the detail shown in FIG. 17. Extending inwardly from the inner surface of the door 160 are a plurality of reinforcing and strengthening fibs 176. During operation of the vessel 22, significant internal pressures are developed in the vessel 22 and the ribs 176 impart sufficient strength and rigidity to the door 160 to avoid undesirable bending and movement of the door which might result from those pressures.

The autoclave door 160 can be removably positioned to cover the opening 178 at the front cone portion 28 of the vessel 22. In order to lock the door 160 in position on the front cone portion 28 of the vessel 22, an annular locking ring 180 is provided. The locking ring fits between a radially inwardly directed shoulder 182 on the door 160 and a radially outwardly directed ledge 184 on the front cone portion 28 of the vessel 22. The locking ring 180 is positioned on a bearing 186 located between the outwardly facing surface at the front cone portion 28 of the vessel 22 and the locking ring 180.

Figure 18:
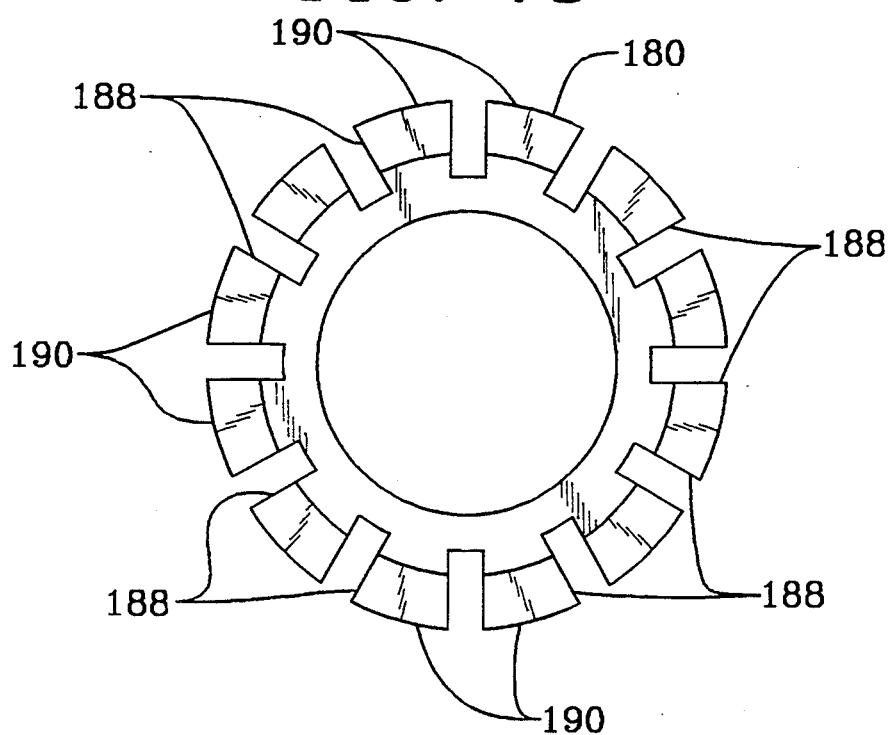
FIG. 18 is a plan view of a locking ring employed to lock the autoclave door in place at the forward end of the vessel.

As seen in more detail in FIG. 18, the locking ring 180 is provided with a plurality of equally spaced apart cut-outs 188. In the illustrated embodiment, twelve cut-outs are provided along the outer periphery of the locking ring 180. The spaced apart cut-outs 188 define spaced apart locking segments 190.

Although not specifically illustrated, the inwardly directed shoulder 182 on the door 160 and the outwardly directed ledge 184 on the front cone portion 28 of the vessel 22 are provided with a plurality of cut-outs that correspond in number to the number of cut-outs 188 on the locking ring 180. In that way, the cut-outs on the locking ring 180, the cut-outs on the inwardly directed shoulder 182 and the cutouts on the outwardly directed ledge 184 can be aligned with one another.

The door 160 is also provided with an annular projection 192 that extends axially towards the rearward end of the vessel 22. A corresponding mating groove 194 at the end face of the front cone portion 28 is adapted to receive the annular projection 192. A suitable sealant 196 is disposed in the groove 194 to effect a tight seal between the door 160 and the front cone portion 28 of the vessel 22.

Preferably, the locking ring 180 can be rotatably driven by an automatic worm drive 198 which is generally illustrated in FIG. 18. It is also preferable that each of the locking segments 190 be slightly tapered in thickness in the annular direction (i.e., from the cut-out 188 on one side to the cut-out 188 on the opposite side). In that way, once the door 160 has been axially fitted over the locking ring 180, the rotation of the locking ring 180 will be accompanied by axial movement of the locking ring 180 as a result of the tapering thickness of the locking segments 190. Consequently, it will be possible to achieve a fight seal at the interface between the projection 192 and the groove/sealant 194, 196.

Preferably, a screen 258 (see FIG. 16) is positioned over the opening 256 in the autoclave door 160 in order to prohibit the passage of large material that may be caught in the slipstream of the venting vapors. Preferably, however, venting through the autoclave door 160 is performed when the vessel is inclined at a significantly steep angle using a relatively low rotational speed in the unloading direction in order to reduce the possibility of large material moving towards the opening or outlet 256.

Figure 11:
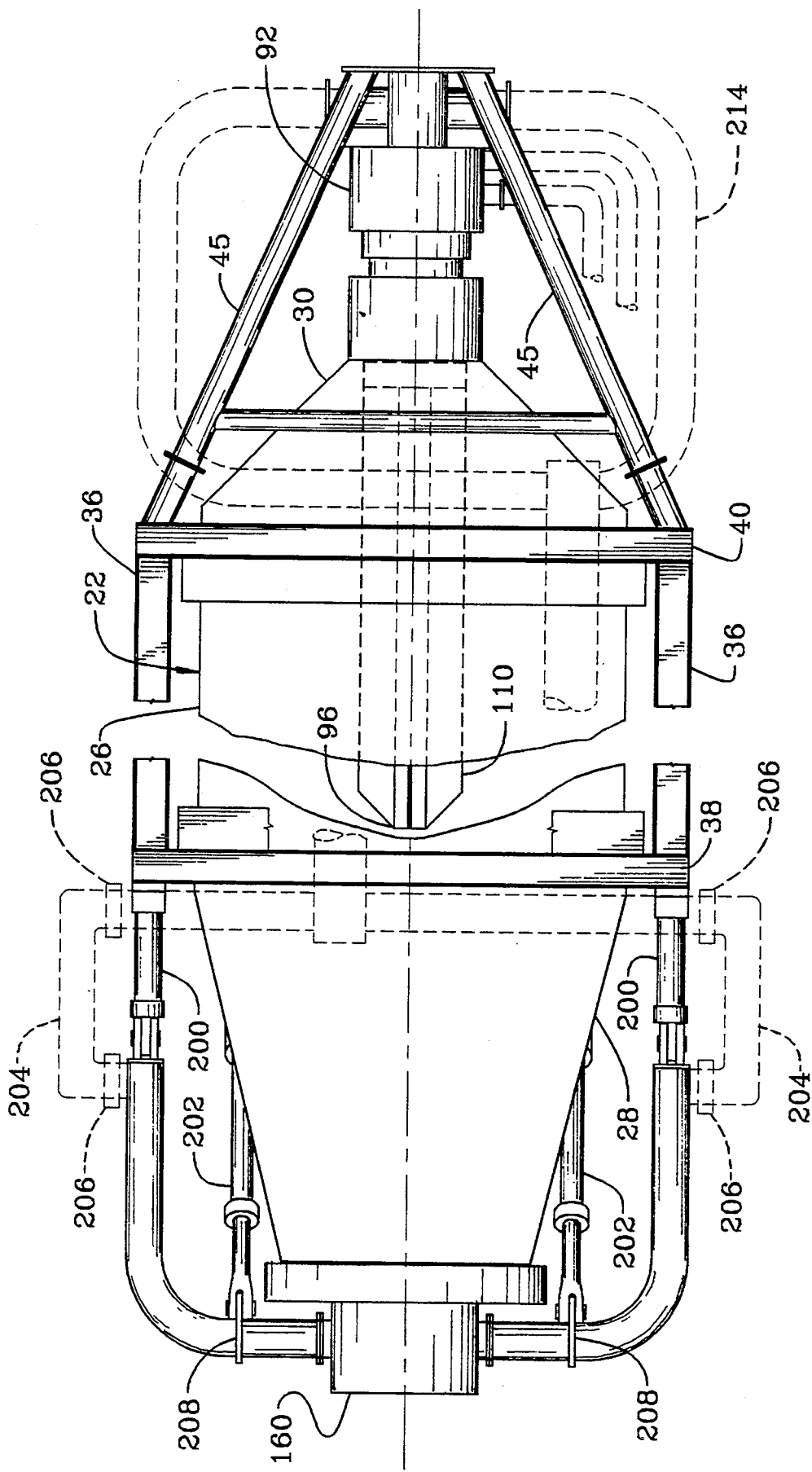
FIG. 11 is a top view of a portion of the apparatus according to the present invention.
Figure 12:
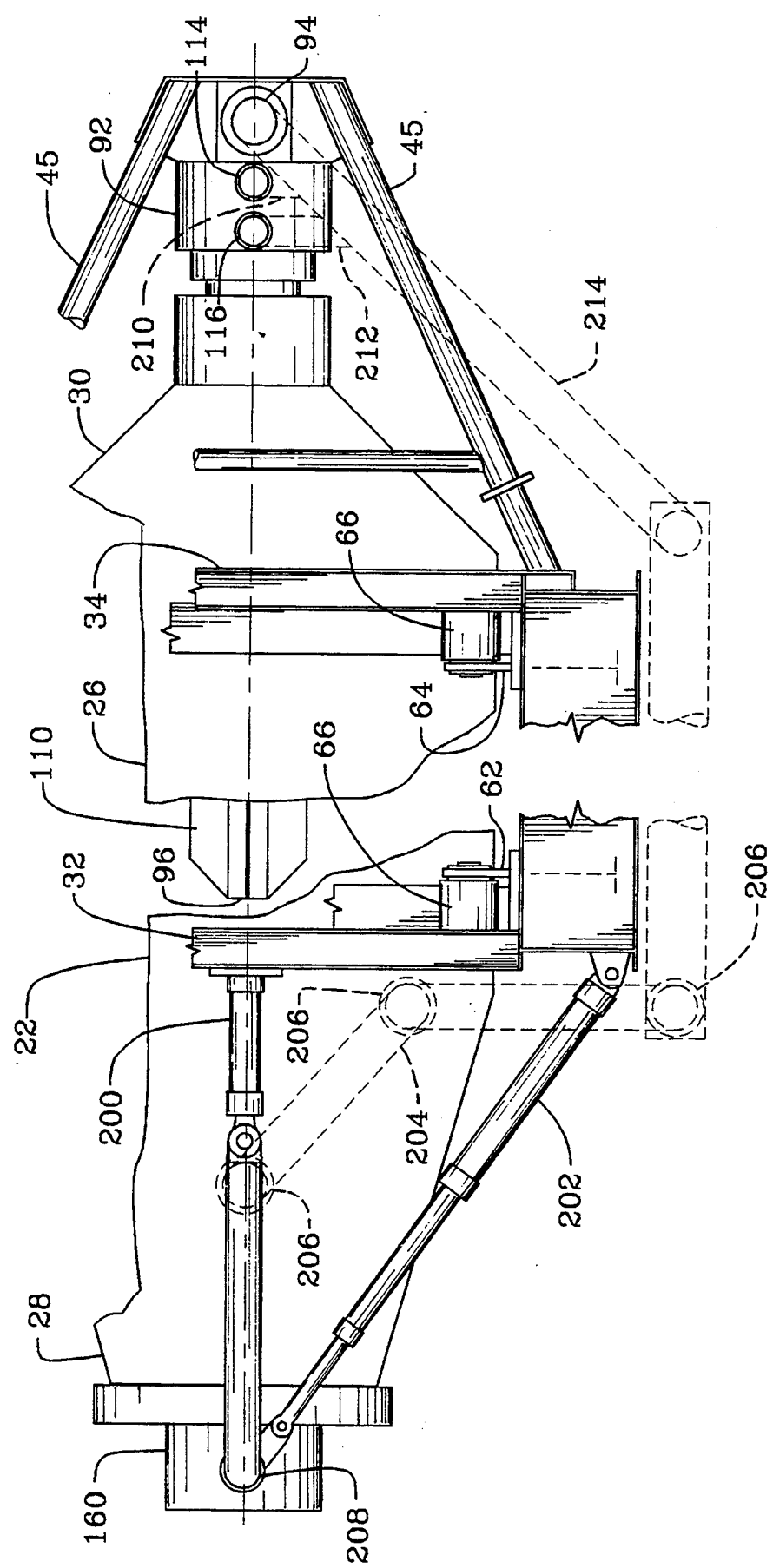
FIG. 12 is a side view of a portion of the apparatus according to the present invention.

As mentioned above, the door 160 is removably secured to the open forward end 28 of the vessel 22 so that during operation of the vessel, material to be treated can be introduced into the vessel and so that material which has been treated can be discharged from the vessel. The opening and closing of the door 160 is effected through operation of a pair of horizontal servomotor piston arrangements 200 and a pair of diagonal servomotor piston arrangements 202 as seen in FIGS. 2, 11 and 12. The horizontal servomotor piston arrangements 200 serve to move the vessel door 160 in an axial direction away from the front cone portion 28 of the vessel 22. On the other hand, the diagonal servomotor piston arrangements 202 move the vessel door downwardly and slightly rearwardly. Thus, the vessel door 160 is movable between a first position 160 (i.e., a sealed as closed position) shown in full line configuration in FIG. 1 to a second position 160' (i.e., a stored or open position) shown in the dotted line configuration in FIG. 1.

The steam outlets 162 provided in the vessel door 160 at the front cone portion 28 of the vessel 22 are connected to a steam vent line 204. As can be seen with reference to FIGS. 11 and 12, the steam vent line 204 is connected to the horizontal servomotor piston arrangement 202. Consequently, during movement of the vessel door from the closed position 160 to the open position 160', the steam vent line 204 also moves. To allow free movement of the door 160, the steam vent line 204 is divided into a plurality of sections which are connected by rotation permitting knuckles 206. The knuckles 206 allow relative movement between the various sections of the steam vent line 204 to thereby avoid inhibiting the movement of the vessel door 160.

As can be also seen from FIGS. 11 and 12, the diagonal servomotor piston arrangement 202 is connected to the steam vent line 204 by way of clamp-like devices 208.

With reference to FIG. 12, heated liquid is supplied to the liquid supply inlet 114 by way of a liquid supply line 210. Similarly, liquid is directed out of the vessel through the liquid return outlet 116 by way of a liquid return line 212. Likewise, steam is supplied to the steam supply inlet 94 by way of a steam supply line 214.

Figure 26A:
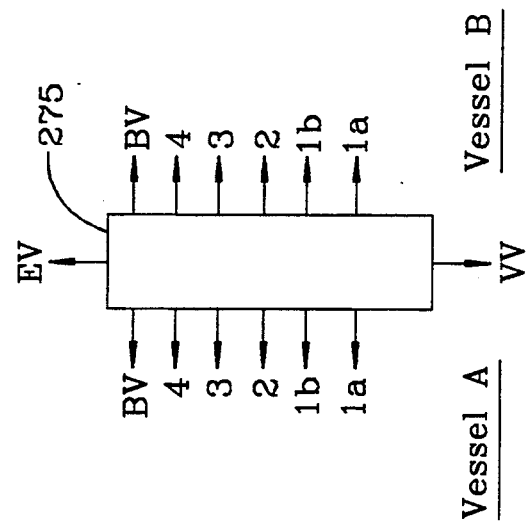
FIG. 26a is a schematic illustration of a controller for controlling the valves illustrated in the system of FIG. 26 as well as other features of the system.
Figure 26:
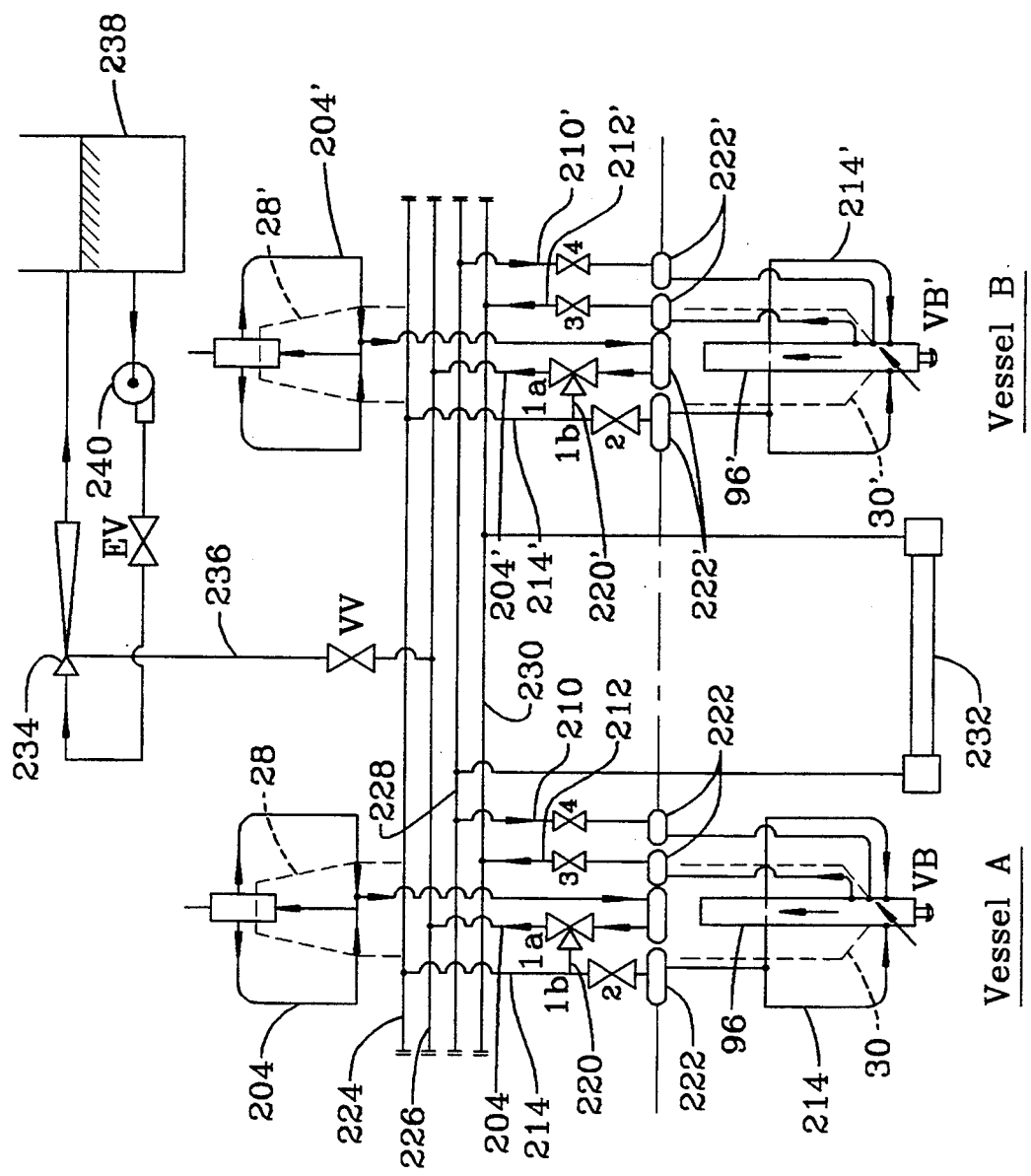
FIG. 26 is a schematic illustration of the piping and valve scheme for a system employing two vessels interconnected with one another.

In addition to the construction of the apparatus as described above with reference to FIGS. 1-24, other aspects of the present invention involve the manner of operation of the apparatus, a system which includes at least two apparatus connected to one another, and the manner of operation of such a system. FIG. 26 schematically illustrates a piping scheme for a system that includes two interconnected vessels, vessel A and vessel B. The features associated with the piping scheme for each vessel are generally the same and are labelled the same except that prime designations are used to distinguish the features of vessel B from the features of vessel A.

As can be seen, each of the vessels A, B includes a steam connecting line 220 and a connecting valve 1b which connects the steam supply line 2 14 to the steam vent line 204. In addition, a steam vent valve la is disposed in the steam vent line 204, a return valve 3 is disposed in the liquid return line 212 and a supply valve 4 is disposed in the liquid supply line 210. Each of the regulating valves 1a, 1b, 2, 3, 4 is movable between an open position and a closed position to direct the flow of fluid through the system. The regulating valves 1a, 1b, 2, 3, 4 can be connected to a controller 275 as generally illustrated in FIG. 26a which controls the valves and which can control the overall operation of the system.

As schematically illustrated in FIG. 26, the steam supply line 214, the steam vent line 204, the liquid supply line 210 and the liquid return line 212 are all provided with swivel joints 222 which allow sections of the lines to move relative to one another during operation of the vessel to accommodate various movements of the apparatus 20. The steam supply line 214 is connected to a steam supply header 224 while the steam vent line 204 is connected to a steam vent header 226. Similarly, the liquid supply line 210 is connected to a liquid supply header 228 while the liquid return line 212 is connected to a liquid return header 230.

The liquid supply header 228 and the liquid return header 230 are both connected to a heat exchanger 232. Thus, liquid which has been fed through one of the vessels A, B to the liquid return header 230 flows into the heat exchanger 232 where it is heated and then returned to the liquid supply header 228. The heat exchanger 232 can be controlled (possibly by the controller 275 shown in FIG. 26a) to heat the liquid to a desired temperature during operation of the vessels A, B in order to heat the material inside the vessels A, B to a desired temperature. As mentioned above, in the preferred embodiment, oil is used as the liquid for imparting heat to the interior of the vessels A, B. Other liquids can be used so long as the vessel can withstand the pressure created during heating of the vessel to the desired temperature.

The rear cone portion 30, 30' of each vessel A, B is preferably provided with a vacuum regulator VB for regulating air input into the vessels during the cooling and drying stages of operation as will be discussed in more detail below. The vacuum regulator VB, which can include a vacuum breaker, can be set to allow air to be input into the respective vessels when the pressure inside the respective vessel becomes less than a set pressure (e.g., 10 or 5 psi below atmospheric). Preferably, the vacuum regulator is connected to a control system (such as generally shown in FIG. 26a) which allows the point at which the vacuum regulator is made operational to be varied. Additionally, as seen in FIG. 26, the vacuum regulator, VB can be positioned in the rear cone portion 30 of the vessel 22.

The steam vent header 226 is connected to an eductor 234 by way of a connecting line 236. A venting valve VV can be disposed in the connecting line 236 and can be connected to a controller (such as the controller 275 generally illustrated in FIG. 26a) which serves to open and close the venting valve VV.

The eductor 234 serves to condense steam by spraying water on the steam passing through the connecting line 236. Water is supplied from a condensate tank 238 and is directed to the eductor through a pump 240 and an eductor valve EV. The collapse of the steam in the eductor 234 creates, in effect, a vacuum which tends to draw steam from the steam vent header 226. Additionally, if the regulating valve 1a is open, the eductor 234 tends to draw steam out of the interior of the respective vessel A, B.

With reference to FIGS. 27A and 27B, an example of the operational modes of one of the vessels A will be described. Thereafter, an example of the operation of the system employing at least two vessels A, B will be set forth. The operation of the vessel and system will be described in connection with the treatment of waste material (e.g., municipal solid waste), but it is to be understood that the vessel and system could also be used to treat other materials as well.

Generally speaking, during the initial phase of operation of the vessel, the waste material to be treated is introduced into the vessel along with a wetting agent. The moisture content of the waste material is further increased through the introduction of steam. The steam also increases the temperature within the vessel as well as the temperature of the waste material itself. Through the use of a heated liquid which is conveyed through the interior of the vessel, desired levels for the temperature and pressure within the vessel are achieved. Throughout much of the vessel operation, the vessel is preferably rotated to break down the paper type products and facilitate cleaning of other materials (e.g., glass, metal objects, etc.). The vessel is then vented to begin the cooling and depressurization of the vessel while at the same time reducing the moisture content of the material within the vessel. The heated liquid which continues to be conveyed through the vessel is then used to dry the material to a desired degree. Once the moisture content and the temperature of the material in the vessel has been reduced to desired levels, the material is emptied from the vessel so that the vessel is then ready to begin another treatment cycle.

To describe the operation of the vessel in more detail, reference is made to FIGS. 27A and 27B. The initial stage in the operation of the vessel is to load the material to be treated into the vessel while also preferably wetting the material. In the loading and wetting mode, the vessel is raised to an angle of approximately forty five degrees as represented by the dotted outline of the vessel 22' shown in FIG. 1. At this point, the vessel door is in the stored mode as represented by the dotted outline configuration 160' in FIG. 1. A loading device 244 comprised of a conveyor 246 and upstanding sidewalls 248 is provided to load material into the vessel. At the forward end of the loading device, a makeup device 242 is provided to connect the loading device to the open end of the vessel 22'. The makeup device 242 provides a smooth transition for introducing material into the interior of the vessel 22'. The loading device 244 is also provided with a circular spray bar 250 which allows a wetting agent (water and/or effluents) to be added to the material as it first enters the vessel 22'. Preferably, spray nozzles on the spray bar 250 are angled to evenly distribute and allow uniform wetting of the material as it starts to free fall into the diverging front cone portion of the vessel.

A desired amount of waste material is loaded into the vessel 22' during the loading and wetting phase. The amount is, of course, dependent upon the type of material and the size of the vessel. By way of example, however, assuming a vessel length of sixty-four feet from the end of the front cone portion 28 to the end of the rear cone portion 30 and an inside diameter of approximately twelve feet, the vessel 22 can be capable of receiving a nominal fifty ton batch of municipal solid waste.

The loading and wetting phase of operation can be carried out for any desired length of time to achieve filling of the vessel, adequate volume reduction of the material and weakening of the paper materials. As seen in the illustrated embodiment depicted in the table of FIG. 27A and 27B, the loading and wetting mode can be carded out for approximately ten minutes while the vessel is rotating at approximately two rpm in the loading direction. The rotation of the vessel in the loading direction is meant to refer to rotation of the vessel in a direction that will cause the material to be moved towards the rearward end of the vessel through the rotary action of the liquid transport conduits 138 (FIGS. 20–25). In the illustrated embodiment, rotation of the vessel in the loading direction is meant to refer to clockwise rotation of the vessel as seen from the rearward end.

The location of the cantilevered shaft 96 is particularly useful during the initial loading and wetting phase when the material is compressed in the lower part of the vessel 22. Also, material densification is enhanced by the helically arranged liquid transport conduits 138 which rotate in the filling direction and shear against the cantilevered shaft 96.

As the material is free falling in the vessel and being wetted by the nozzles on the circular spray bar 250, the structure of the paper products almost immediately starts to weaken. Moreover, as the paper products contact the vessel wall 150 and the rotating helices defined by the liquid transport conduit 138, the softened material reforms to a higher bulk density. This volume reduction phase is significantly aided by the rotation of the vessel in the loading direction which mechanically packs the material into the lower portion (i.e., the rear cone portion 30) of the vessel. In addition, a strong shearing action occurs in the lower or rearward end of the vessel due to the presence of the vanes 110 on the cantilevered shaft 96. This shearing action tears open much if not all of the containerized materials in order to allow them to be exposed to the tumbling wetted environment created within the vessel. This shearing action also mechanically reduces the structural integrity of parts of the materials, such as heavy cardboard, in order to expedite pulping.

At about the end of the loading and wetting phase, the pressure inside the vessel 22 is substantially atmospheric, the temperature in the interior of the vessel is approximately ambient and the material possesses a moisture content of approximately forty percent. In the table shown in FIGS. 27A and 27B, the percent moisture of the material applies only to the biomass portion of the material.

After completion of the loading and wetting phase and prior to initiation of the door closure operation, the makeup piece 242 (FIG. 1) is retracted and the vessel 22 is pivoted so that the top of the vessel is below the loading and wetting device 244. The vessel 22 should be lowered so that enough clearance exists to allow the autoclave door 160 to be closed and sealed over the opening at the front cone end 28 of the vessel 22.

During the door closure operation, the vessel is stationary. To effect closure of the autoclave door 160, the diagonal servomotor piston arrangements 202 (FIGS. 2, 5, 11 and 12) are operated to lift the autoclave door 160 from the stored positioned underneath the front cone portion 28 of the vessel to a position in front of the vessel 22. Thereafter, the diagonal servomotor piston arrangements 202 and the horizontal servomotor piston arrangements 200 (FIGS. 2, 11 and 12) are operated to bring the autoclave door 160 into engagement with the front cone portion 28 of the vessel 22. Operation of the diagonal servomotor piston arrangements 202 and the horizontal servomotor piston arrangements 200 can be controlled by a suitable control arrangement such as the controller generally depicted in FIG. 26a.

With the autoclave door 160 moved into position at the front end of the vessel 22, the locking ring 180 (FIGS. 16, 18, 19) located at the front cone portion 28 of the vessel 22 is positioned such that the cut-out portions 188 are aligned with the corresponding cut-out portions on the inwardly directed ledge 184 at the front cone portion 28 of the vessel 22. The cut-out portions (not shown) on the radially inwardly directed shoulder 182 of the autoclave door 160 are also aligned with the cut-out portions 188 on the locking ring 180. As a result, the autoclave door can be positioned on the forward end 28 of the vessel 22 in the manner shown in FIG. 19.

Once in position, the locking ring 180 is rotated approximately 15° by the drive mechanism 198, whereupon the annular projection 192 is forced into intimate contact with the groove 194 formed in the end face of the front cone portion 28 of the vessel 22. Close metal-to-metal contact and a tight seal with the sealant 196 is facilitated by the tapering thickness provided on the locking segments 190 of the locking ring 180.

As seen in the table of FIGS. 27A and 27B, once the autoclave door 160 is closed and sealed in position at the front face of the front cone portion 28 of the vessel, the vessel undergoes a degassing mode of operation. During this degassing mode, the vessel 22 is preferably rotated in the loading direction at a speed of approximately two rpm with the vessel located at an articulation angle of approximately 38°. During the degassing mode, the regulating valve 2 in the steam supply line 214 is open so that steam flows from the steam supply header 224 to the steam supply line 214 and into the interior of the vessel 22 by way of the openings or jets 112 disposed along the length of the cantilevered shaft 96. In addition, the regulating valve 1a disposed in the steam vent line 204 is open so that gas can be vented from the interior of the vessel 22 to the steam vent header 226 by way of the steam vent line 204. The steam that is vented to the steam vent header 226 is drawn into the eductor 234 where it is condensed and stored in the tank 238. As will be described below in more detail, the steam which is drawn into the vessel can be supplied from another vessel (or series of vessels) which has already progressed through a cooking stage of operation.

The jets or openings 112 in the cantilevered shaft 96 are located such that they are well within the mass of waste material that is located in the lower portion of the vessel (i.e., the rear portion of the vessel) and that is being sheared, compressed and compacted by the continued loading operation. The waste material thus receives maximum initial treatment by the shearing action of the shaft 96 and the fins 110 as well as the impact from the steam which is at about 50 psig and 300° F. This operation is particularly effective in conditioning and softening the material contained in the vessel since the interior of the vessel is still at approximately atmospheric pressure. Thus, maximum differential pressure is provided for the steam jets.

During the degassing phase, steam is drawn in conjunction with non-condensable gases (i.e., predominantly air entrapped in the rotating material) into the eductor 234 where gas separation from the water vapor and condensation takes place. More particularly, the mixture of water vapor and gasses is drawn into the eductor 234 where the vapor collapses to steam upon contacting the eductor water spray and joins the water in the condensate tank 238. Gas also enters the condensate tank 238, and can be withdrawn and exhausted to the heat exchanger 232. Extraction of the non-condensable gasses from the tank 238 can be achieved by creating a centrifugal spiral movement within the tank 238 that optimizes the separation of the water from the gas. Since the vessel 22 is substantially purged of non-condensable gases, the subsequent heating and wetting phase for pulping under pressure can begin within a saturated steam environment.

During the degassing phase, the regulating valves 3, 4 are also open, Thus, heated liquid from the heat exchanger 232 is directed through the liquid supply line 210 where it flows through the liquid supply conduit 140 and then is returned through the liquid return conduit 142 to the liquid return line 212 and the liquid return header 230. This flow of heated liquid through the liquid supply conduit 140 and the liquid return conduit 142 heats the interior of the vessel as well as the material in the vessel. The table shown in FIGS. 27A and 27B indicates that the temperature at the end of this degassing phase is "arab+" which means that the temperature is in excess of ambient temperature. The actual temperature at the end of the degassing phase may vary, but the result sought is a relative humidity of about 95% or greater which would indicate that all non-condensable gases have been substantially evacuated.

The degassing phase can be carried out for a variable period of time, although it has been found that even the most bulky materials should not require more than about three minutes. As noted above, the relative humidity of the gases exiting the vessel will preferably establish the end point of the degassing stage.

Upon completion of the degassing mode, the vessel begins a pulping and condensing mode of operation. During this phase, the speed of rotation of the vessel 22 can be increased (to approximately four rpm in the illustrated embodiment) while the direction of rotation is reversed so as to be rotated in the loading direction (i.e., the direction opposite the direction of rotation that occurred during the loading and wetting phase, and the degassing phase). In addition, the vessel 22 can be lowered somewhat (to an articulation angle of approximately twenty degrees in the illustrated embodiment).

In the context of the columns in the table of FIGS. 27A and 27B relating to the angle of articulation of the vessel, the symbol "±" means that the vessel is in an automatic balancing mode. That is, as described above, the vessel supports 62 are provided with load detecting sensors 70 for detecting the amount of load applied to each pair of vessel supports 62, 64. If the sensors 70 determine that more load is applied to one of the pairs of vessel supports 62, 64 than the other, the motor 56 associated with the rack and pinion arrangement 50, 54 begins operation to cause the forward end of the vessel 22 to be raised or lowered in order to effect a balancing of the material within the vessel. Thus, the symbol "±" in the table of FIGS. 27A and 27B indicates that the vessel is in a mode which seeks to achieve a balancing of the loads on the two vessel supports 62, 64 so that the material within the vessel is relatively evenly distributed. The vessel can be designed to effect an automatic balancing of the material within the vessel whenever the weight differential between the two pairs of vessel supports 62, 64 exceeds five percent, for example. The load leveling program used to perform the automatic balancing mode of operation is preferably designed with some form of dampening feature (e.g., by initiating the load leveling program at certain spaced apart time intervals) that inhibits the vessel from continually pivoting about the pivot axis 48.

During the pulping and condensing phase, steam continues to be introduced into the interior of the vessel by way of the jets or openings 112 in the shaft 96 to increase the moisture content of the material in the vessel 22. Thus, steam transfer to the waste material in the vessel 22 is carried out by way of the various jets or openings 112 located along the length of the shaft 96. The positioning of the jets or openings 112 is preferably selected to permit uniform, rapid heat and moisture transfer to the tumbling materials within the vessel. In addition, steam is distributed away from the vessel surface such that the inner mass of the bulk of the material receives moisture in the most expeditious manner.

The duration of the pulping and condensing phase is governed, at least in part, by the amount of heat and moisture required to bring the resulting biomass feedstock to the desired moisture content which can be about forty-eight percent by weight moisture content. Preferably, during the original weigh batching of the material prior to introduction into the vessel 22, an estimate is made of the inherent moisture content of the batch material. In addition, the moisture added by way of the wetting agent is calculated in order to determine the amount of steam that must be introduced into the vessel to reach the desired moisture content at the prevailing temperature, which can be on the order of approximately 200° F.

In the pulping and condensing phase, steam flowing into the interior of the vessel 22 is condensed rather rapidly as it directly contacts the relatively cool materials that are being vigorously tumbled within the vessel. The material preferably reaches its maximum water content in this phase. The maximum water content is preferably selected or calculated to optimize the transfer of clay and inks from the paper products to the high-pressure liquid located within the vessel. In addition to imparting moisture to the waste material, the steam heats the waste material. The heating of the waste material is supplemented by way of the heated liquid flowing through the fluid transport conduits 138 and the fins or vanes 154. A significant amount of heat transfer is achieved within the vessel as a result of the continuous wetting of the helically arranged liquid transport conduits 138 from the saturated steam atmosphere and the resulting heat evaporation that takes place.

Once the desired moisture content is reached, regulating valves 1a and 2 are closed, thereby ceasing the introduction of additional steam through the jets or openings 112 in the cantilevered shaft 96. The moisture content sought is preferably that within the biomass portion of the materials which creates a hydrophilic mass and permits a complete pulping of all paper products.

The next mode of operation of the vessel 22 is the pulping and heating phase. Here, heat continues to be introduced into the interior of the vessel 22 as a result of the heated liquid flowing through the liquid supply conduit 140 and the liquid return conduit 142. During the pulping and heating phase, the rotational speed of the vessel 22 can be increased (to approximately eight rpm in the illustrated embodiment) while the vessel is lowered slightly (to an articulation angle of approximately twelve degrees in the illustrated embodiment). In addition, the vessel 22 continues to operate in an automatic balancing mode to effect substantially equal distribution of the material within the vessel. The pulping and heating phase can continue until the pressure and temperature within the vessel reach desired values which can be on the order of approximately 45 psi and 275° F.

In the heating and pulping phase, the material being pulped is vigorously tumbled in a water-saturated steam atmosphere. Further, during the pulping phases, significant solubilization takes place. Moreover, the physical characteristics of the material continuously change as the material structure is softened, the particle size is diminished, and the volume is reduced. The effectiveness of this stage of operation is greatly enhanced by uniformly distributing the materials along the vessel length through operation of the automatic balancing mode described above. Depending on the type of material being treated, the aforementioned damping of the load leveling program may be particularly necessary in the pulping and condensing phase, and the pulping and heating phase. In the case of relatively homogeneous materials, damping of the load leveling control may not be of paramount importance. However, in the case of mixed materials such as those found in municipal solid waste, it can be of significant importance in achieving uniformity and the production rates required for commercial viability.

Upon completion of the pulping and heating phase, the vessel now begins the cooking phase. The action started during the pulping and heating mode is continued in this phase in order to further increase the temperature and pressure inside the vessel. Preferably, the temperature and pressure within the vessel are increased to values approaching approximately 300° F. and approximately 50 psi. In addition, the speed of rotation of the vessel can be increased slightly (to approximately ten rpm in the illustrated embodiment). Heated liquid continues to flow through the fluid transport conduits 138 to effect continued heating of the interior of the vessel 22 and the waste material in the vessel. Likewise, steam can continue to be introduced to the interior of the vessel by way of the openings or jets 112 in the shaft 96. Thus, from the pulping and heating phase to the cooking phase, the regulating valves 1a, 1b, 2, 3, 4 can remain in the same position. Preferably, the mixture content achieved in the pulping and heating mode is maintained during the cooking phase.

Achieving a temperature of approximately 300° within the vessel during the cooking phase can be quite advantageous when plastic material is present in the waste material, a situation not uncommon in the case of municipal solid waste. The plastic material can take the form of low-density plastic material which typically melts or beads at a temperature of approximately 260°–270° F. and high-density plastic material which typically melts at a temperature greater than 300° F. High density plastics such as PET and HDPE constitute a valuable recyclable product and should, therefore, not be melted in order to facilitate their sorting from the conditioned waste material. The environment created within the vessel during the cooking stage is preferably designed to avoid the melting of high density plastic.

On the other hand, low density plastics such as plastic film and expanded polystyrene (EPT) are typically present in the waste material in the form of sheets or are low in bulk. Thus, they can complicate the downstream sorting of the waste material. However, in an environment heated to approximately 300° F., the low-density plastic material will tend to bead or form small balls. In this form, the low-density plastics can be readily screened away from the other materials, thereby facilitating size sorting. In addition, the apparatus of the present invention provides flexibility in controlling the temperature and moisture within the vessel. Thus, when low-density plastics are present in the material being treated, the repulping of the paper products can be accomplished before the melting of the low density plastics, thereby permitting physical separation to occur before the small beads of pellets are created. Thus, it is possible to minimize the locking of cellulose or other non-plastic material within these pellets or beads. Also, the hydrophobic character of the plastic is advantageous as it repels the water loaded pulp thereby reducing the mixing between the plastic and the loaded pulp so as to provide a cleaner and more uniform plastic for a recycling feedstock.

In the illustrated embodiment, the cooking phase can continue for a period of about twenty-seven minutes during which time the moisture content remains substantially constant. Also, during the cooking phase the vessel 22 operates in the automatic load balancing mode to effect substantially equal distribution of the material within the vessel.

In the cooking phase, substantially complete breakdown and pulping of the cellulosic material can be achieved while the soluble components are dissolved and contained within the high-pressure liquid that is present in the vessel. Also, when steel cans with labels and food waste are present in the material being treated, it is possible to carry out excellent cleaning to the base material. Once separated, these materials possess a greater recycle value over materials that are normally sorted prior to such a treatment operation.

When glass is present in the material being treated, significant breakage typically occurs. It has been found that excessive fine shards of glass can complicate the final cleanup of the biomass. However, the tumbling action of the vessel and the helical arrangement of the liquid transport conduits 138 that act on the glass material helps minimize formation of minute shards from the glass. That is, the helically arranged fluid transport conduits 138 are designed to avoid sharp edges. Thus, while the glass present in the waste material will be broken into a number of pieces, the absence of sharp edges on the fluid transport conduits help avoid splintering of the glass through excessive contact with sharp edges. Also, the fluid transport conduits 138 are helically arranged in manner that causes a relatively uniform layer of biomass to be carried through the lower part (i.e, rear part) of the rotating vessel to thereby cushion the tumbling glass as it falls within the vessel.

The next phase of operation of the vessel is the venting and drying phase which, in the illustrated embodiment, can take place for a period of approximately eighteen minutes. During this phase, the rotational speed of the vessel 22 in the unloading direction can be reduced slightly, possibly to a speed of about eight rpm as shown in the illustrated embodiment. Also, the vessel 22 can be raised slightly (to an articulation angle of approximately thirty degrees in the illustrated embodiment).

During this venting and drying phase, the regulating valves 3, 4 remain open so that heated liquid continues to flow through the liquid supply conduit 140 and the liquid return conduit 142. In addition, the regulating valve 1b is opened. In that way, steam flowing out of the steam outlet 162 and through the steam vent line 204 is directed through the steam supply line 214 to the steam supply header 224. As will be described in more detail below, the vented steam can be transferred to another vessel or other vessels which are in a relatively cold state to thereby heat the cold vessels while at the same time preventing unnecessary loss of heat generated in the hot vessel. The interior of the vessel 22 as well as the waste material in the vessel experiences a reduction in temperature during the venting and drying phase. Similarly, the pressure within the vessel 22 decreases as does the moisture content of the waste material within the vessel 22.

The rotation of the vessel 22 in the unloading direction during the venting and drying phase continues to pulp the material within the vessel and facilitate the release of steam vapor. A significantly rapid pressure drop occurs during the initial few minutes of the venting and drying phase. This can create a steam explosion in the cellulosic materials, thereby exposing the maximum surface for later treatment or processing of the biomass.

The venting and drying phase can continue until the pressure within the vessel reaches about −5 psi. The vacuum breaker VB is preferably set at about −5 psi so that the pressure within the vessel does not drop below that value.

Upon completion of the venting and drying mode of operation, the vessel 22 moves into an extraction and drying phase. Here, the rotational speed of the vessel can be decreased slightly (to approximately four rpm in the illustrated embodiment) in the unloading direction. In addition, the vessel 22 can be lowered slightly, for example to an articulation angle of approximately twelve degrees as shown in the illustrated embodiment. Also, the vessel 22 can operate in the automatic balancing mode to continue to effect substantially equal distribution of the material within the vessel.

During the extraction and drying mode, the regulating valve 1b is preferably closed while the regulating valve 1a remains open. Thus, the steam that is vented out of the vessel 22 will flow through the steam vent line 204 to the steam vent header 226 whereupon it will be directed to the eductor 234. In that way, the temperature in the vessel will continue to decrease as will the pressure and the moisture content of the waste material. The cooling down of the vessel 22 will take place by discharging steam vapor to the eductor unit 234 and can continue until the material cools down to approximately 150° F. with a moisture content of approximately thirty-five percent. In the extraction and drying mode, the vacuum breaker VB is preferably set at about −10 psi. In that way, additional heat can be drawn from the biomass located in the vessel. If the pressure within the vessel falls below −10 psi, air will be introduced to the interior of the vessel by way of the vacuum regulator VB. The air will then be drawn through the vessel to the eductor, thereby contributing to further cooling and drying of the biomass. This drying phase can be extended through the continual addition of heat resulting from the flow of heated liquid through the helically arranged liquid transport conduits 138.

During the drying phases, the hydrophilic properties of the pulped biomass causes substantially all of the free and surface moisture to be absorbed from the inorganic materials. Thus, the sticking of the biomass to other articles can be greatly reduced, thereby facilitating the sorting of the material at a later stage. Entrapment of solubilized foodwaste within the biomass also enhances the cleanliness of the articles to be separated.

It has been found that a high-quality water distillate suitable for further process use can be recovered. Through operation of the vessel 22, the quality of the water recovered in the condensate tank 238 can be significantly higher than the fluid (i.e., wetting agent) used during the initial stages of operation and can be significantly higher than the inherent moisture in the stream of waste material initially delivered to the vessel. When plastics are present in the material being treated, the drying of the material should be limited by maintaining a supersaturated environment in the vessel in order to minimize sticking of the plastics to the vessel heating surfaces. In a supersaturated environment, all surfaces of the vessel interior will have a film of moisture which will tend to inhibit the plastic material from sticking to the interior surfaces of the vessel.

Upon completion of the extraction and drying phase, the autoclave door 160 is once again removed from the forward end 28 of the vessel through suitable operation of the horizontal servo motor piston arrangement 200 and the diagonal servomotor piston arrangement 202. During this movement of the autoclave door to the stored position 160' shown in FIG. 1, the vessel 22 remains stationary. Further, all of the regulating valves 1a, 1b, 2, 3 and 4 are closed. During the door removal stage, it may be necessary to verify that the vessel has been properly vented in order to ensure that the internal pressure is at atmospheric pressure. A suitable pressure monitor can be provided to indicate the prevailing pressure within the vessel. Such a monitor would also provide an indication of the prevailing pressure in the vessel 22 during the various modes of operation.

After the autoclave door has been moved to the stored position 160', the vessel is lowered so that the front cone portion 28 of the vessel 22 is approximately fifteen degrees below the horizontal position. In this position, which is designated 22" in FIG. 1, the open end of the vessel is positioned adjacent a feeder box 252 which is located above a conveyor 254. Once the vessel has been lowered to the position 22" shown in FIG. 1, the vessel begins rotating at a relatively low speed (approximately two rpm in the illustrated embodiment) in the unloading direction to help facilitate removal of the waste material from the interior of the vessel. The treated waste material is unloaded into the feeder box 252 so that it can be transported by the conveyor 254 to a suitable location for separation or other processing. The rotational speed of the vessel can remain generally constant during the unloading phase depending on the incoming consistency of the waste stream which can materially affect the discharge flow characteristics. The discharge characteristics of the material in the vessel can also be affected by centrifugal separation occurring in the rotating vessel due to the various different densities of the treated materials. If necessary, the rotational speed of the vessel can be varied to effect relatively fast and efficient discharge of the waste material from the vessel.

Once the vessel is completely emptied, the rotation of the vessel is stopped and the vessel is raised once again to an articulation angle of about forty-five degrees. Thereafter, the makeup device 242 on the loading and wetting device 244 is actuated to couple the loading and wetting device 244 to the open forward end 28 of the vessel 22. The vessel can then proceed through the same sequence of operations described above.

As noted above, the material that has been unloaded onto the conveyor 254 can be conveyed to a sorting and separating station where standard screening equipment can be employed to further separate and sort the various components using trommels, vibratory screens or other equipment. Through achievement of an optimum moisture condition in the biomass during the drying phase, it is possible to utilize such screens to readily separate the organic biomass from the inorganic portion. Standard metal separation equipment such as cross belt magnets and eddy current separators combined with air density separators permits feedstock streams to be collected and stockpiled or baled for downstream use. This is particularly useful for the separated biomass which can be further processed for a number of uses which may vary to suit various market needs. These varied market needs include, among others, long fiber for the paper industry, a feedstock for glucose manufacture, a biofuel for steam generation and a base material for composting. A number of processes may also be employed to utilize the significant foodwaste that is solubilized in the biomass moisture after the steam process. For example, it may possible to use this material as a source of methane for boiler fuel use, for steam generation or for heat exchange liquids. Prior to the aforementioned separation methods, a suitable separating device providing three size distributions (e.g., over two inches, between two inches and one-half inch, and below one-half inch) can be employed to achieve an adequate size classification.

Having described the operation of a single vessel, reference will now be made to FIGS. 26 and 27 to describe the manner of operation of a system that includes at least two vessels A, B that are interconnected with one another. The table shown in FIGS. 27A and 27B sets forth the operational modes for each of the vessels A, B. The table also sets forth the operational parameters for each of the vessels A, B as well as the positions of the regulating valves 1a, 1b, 2, 3 and 4 associated with each vessel A, B. Further, the operational conditions of the breaker valve VB associated with each vessel A, B and the operational conditions of the venting valve VV and the eductor valve EV for the system are included.

In the illustrated embodiment, each of the vessels A, B operates in the same manner and proceeds through the various modes described above, However, the operation of the two vessels A, B are out of synch with one another in a manner that optimizes efficient operation of the vessels A, B. The operational mode of one vessel when the other vessel is in a particular operational mode can be determined by comparing the start and finish time for each vessel as shown in FIGS. 27A and 27B. By way of example, when vessel A is in the venting and drying mode (i.e, during the time frame 67-85 minutes from the time when the material is initially loaded into the vessel), vessel B is operating in the degassing mode followed by the pulping and condensing mode. Similarly, when vessel A is operating in the pulping and condensing mode (i.e, during the time period of 15-30 minutes after the material is first loaded into the vessel), vessel B is operating in the midst of the venting and drying mode.

During the loading and wetting phase of operation of vessel A, vessel B is in the midst of the cooking mode. Vessel B continues in the cooking mode for a period of time sufficient to treat the waste material to the extent desired. In the illustrated embodiment, vessel B completes its cooking phase of operation at the same time vessel A completes the door closure operation. Vessel B then moves into the venting and drying mode while vessel A moves into the degassing mode.

As can be seen from the table in FIGS. 27A and 27B, during the venting and drying phase of operation for vessel B, regulating valves 1a and 2 associated with vessel B are closed while regulating valves 1b, 3 and 4 associated with vessel B are open. Thus, steam in the interior of vessel B resulting from the cooking operation flows through the steam vent line 204', through the regulating valve 1b and to the steam supply header 224. At the same time, regulating valves 1a and 2 associated with vessel A are open which means that steam is drawn into the cold vessel A from the hot vessel B, partly through operation of the eductor 234 and partly by way of the pressure differential between the two vessels A, B. Thus, the temperature within vessel A begins to increase slightly while the temperature within vessel B is reduced slightly. Also, the interior of vessel A is substantially purged of non-condensable gasses. The temperature within vessel A also increases due to the heated fluid flowing through the fluid transport conduits 238.

As noted above, completion of the degassing phase for vessel A can be determined by measuring the relative humidity within vessel A. When the relative humidity reaches 95%±, vessel A moves into the pulping and condensing mode of operation while vessel B remains in the venting and drying phase of operation. The operation of vessel A in the pulping and condensing mode is similar to that which occurs during the degassing mode except that the direction of rotation of the vessel A is reversed and the speed of rotation can be increased.

During the pulping and condensing mode of operation for vessel A, the eductor valve EV is shown as being in the open condition. It is understood, however, that the eductor 234 (through suitable operation of the eductor valve EV) can be set to a minimum suction in order to minimize the amount of heat and moisture withdrawn from the hot vessel B through the cold vessel A to the eductor 234. This minimum suction state of the eductor valve EV would optimize the trapping of moisture and heat in the cold vessel A from the hot vessel B.

As a result of the transfer of heat and steam from hot vessel B to cold vessel A, the temperature within vessel A can be raised to a desired level which, in the illustrated embodiment, is approximately 200° F. In addition, steam introduced into vessel A by way of the regulating valves 1a, 2 associated with vessel A causes an increase in the moisture content of the material in vessel A. In the illustrated embodiment, the material in vessel A reaches a maximum moisture content (which can be approximately forty-eight percent) upon completion of the pulping and condensing phase.

Until the cold vessel A and the materials therein approach a temperature of 212° F., the pressure is essentially atmospheric. So long as the pressure differential between the hot vessel B and the cold vessel A is greater or equal to about 5–10 psi, heat transfer between the two vessels A, B is relatively efficient. However, when the pressure differential between the two vessels A, B becomes less than about 5–10 psi, efficient transfer of heat to vessel A is more difficult. Thus, when the pressure within vessel B reaches approximately 5 psi below atmospheric and the temperature within vessel A is still below 212° F., the transfer of heat to vessel A cannot be easily accomplished. The pulping and condensing phase of operation for vessel A can end when the pressure within vessel B reaches 5 psi below atmospheric. The vacuum breaker VB associated with vessel B is preferably set at about 5 psi below atmospheric during the venting and drying mode so that the pressure within vessel B does not fall below that level.

It is expected that approximately fifty percent of the heat required for heating the cold vessel can be transferred from the hot vessel B. Also, the heat recovery potential of the system can approach sixty percent.

After the pulping and condensing mode, vessel A moves into the pulping and heating phase, whereupon the regulating valves 1a and 2 associated with vessel A are closed. Thus, heat is no longer transferred from hot vessel B to cold vessel A. Rather, further heat is supplied to vessel A by way of the fluid transport conduits 138.

As vessel A moves into the pulping and heating phase, vessel B moves into the extraction and dry phase of operation in which the associated regulating valve 1a is opened and the associated regulating valve 1b is closed. Thus, the eductor 234 continues to draw heat out of vessel B by way of the steam vent line 204' and the connecting line 236. In the extraction and drying phase of operation, the vacuum breaker VB associated with vessel B is changed to −10 psi. The steam created by the cooling biomass in vessel B controls the negative pressure created by the eductor 234. When the steam generation from the biomass in vessel B is reduced, air flow through the eductor valve VB associated with vessel B will commence in order to further dry the biomass. That is, by reducing the pressure within vessel B (through operation of the eductor 234) to a value below −5 psi, it is possible to draw off further steam from the cooling biomass located in vessel B. When the pressure within vessel B reaches −10 psi, the vacuum breaker VB will allow air to flow into vessel B which will then be drawn through vessel B to the eductor 234. Cooling of the hot fluid within the fluid transport conduits 138 also takes place during the cooling of the biomass in vessel B. Even if the fluid within the fluid transport conduits 138 is not being replenished during this drying and extraction phase, the fluid within the fluid transport conduits 138 represents an ongoing source of heat.

The extraction and drying phase of vessel B is continued until the temperature and pressure inside vessel B are reduced to a desired degree. In the illustrated embodiment, the extraction and drying phase of vessel B can continue until the temperature in vessel B reaches approximately 150° F. and the pressure is reduced to approximately 10 psi below atmospheric. As noted above, should the pressure within vessel B become less than approximately 10 psi below atmospheric pressure, the vacuum breaker VB permits air to be introduced into the vessel B. Of course, the vacuum breaker VB associated with vessel B can be set to a value below −10 psi if it is desired to reduce the temperature of the biomass within vessel B to a value less than about 150° F.

Concurrently during the extraction and drying phase of operation of vessel B, vessel A operates in the pulping and heating mode. In this mode, heated liquid continues to flow through the helically arranged liquid transport conduits 138 within vessel A (due to the open nature of the regulating valves 3, 4 associated with vessel A) to heat the interior of the vessel to a desired temperature (approximately 275° F. in the illustrated embodiment) and a pressure of approximately 45 psi. At the same time, the regulating valves 1a, 1b, 2 for vessel A are closed so that steam is no longer introduced into the interior of the vessel A.

The extraction and drying phase of vessel B and the pulping and heating phase of vessel A are continued for a period of time sufficient to reduce the temperature within vessel B to a desired level (150° F. in the illustrated embodiment) and to increase the temperature and pressure within vessel A to desired levels (275° F. and 45 psi in the illustrated embodiment). Thereafter, vessel A begins the cooking phase which can extend for a period of time sufficient to effect the desired final treatment of the waste material (approximately twenty-seven minutes in the illustrated embodiment). In the cooking phase, the temperature and pressure within vessel A are raised to desired levels (approximately 50 psi and 300° F. in the illustrated embodiment).

While vessel A is proceeding through the cooking cycle, vessel B proceeds through several stages of operation including the door storage mode in which the autoclave door 160 is moved to the stored position, the lower and unloading mode in which vessel B is lowered and emptied, the raise vessel mode in which vessel B is raised to receive the next batch of material to be treated, the engage make-up mode in which the make-up device 242 associated with the loading and wetting device 244 is engaged at the forward end of vessel B, the loading and wetting mode in which the material to be treated is simultaneously loaded and wetted into vessel B, and the door closure mode in which the autoclave door 160 is moved to the closed position to seal vessel B.

Once vessel B reaches the end of the door closure mode, vessel A has reached the end of the cooking mode. Thus, vessel A shifts into the venting and drying mode in which the regulating valves 1a and 2 associated with vessel A are closed while the regulating valves 1b, 3 and 4 associated with vessel A are opened. Thus, steam and heat which have been generated inside vessel A during the cooking mode are vented through the steam vent line 204 to the steam supply header 224 by way of the regulating valve 1b and the steam supply line 214.

At about the same time vessel A moves into the venting and drying mode, vessel B moves into the degassing mode. During this phase of operation, the steam which is vented from hot vessel A is introduced into the interior of cold vessel B by way of steam supply line 214' and the regulating valve 2. The operation of vessel B in the degassing mode is much the same as the operation of vessel A in the degassing mode as described above. Likewise, the operation of vessel A in the venting and drying mode is much the same as the operation of vessel B in the venting and drying mode as described above.

While in the venting and drying phase of operation, regulating valves 1a and 2 associated with vessel A are closed while regulating valves 1b, 3 and 4 associated with vessel A are open. Thus, steam in the interior of vessel A resulting from the cooking operation flows through the steam vent line 204, through the regulating valve 1b and to the steam supply header 224. The regulating valves 1a and 2 associated with vessel B are open which means that steam is drawn into the cold vessel B from the hot vessel A, partly through operation of the eductor 234 and partly by way of the pressure differential between the two vessels A, B. Thus, the temperature within vessel B begins to increase slightly while the temperature within vessel A is reduced slightly. Also, the interior of vessel B is substantially purged of non-condensable gasses. The temperature within vessel B also increases due to the heated fluid flowing through the helically disposed fluid transport conduits 238.

The completion of the degassing phase for vessel B can occur when the relative humidity within vessel B reaches 95%±, At that time, vessel B moves into the pulping and condensing mode of operation while vessel A remains in the venting and drying phase of operation. The operation of vessel B in the pulping and condensing mode is similar to the operation of vessel A in the pulping and condensing mode as described above.

Once the pressure and temperature within vessels A and B reach desired values (approximately 5 psi below atmospheric pressure and 170° F. in the illustrated embodiment for vessel A, and approximately atmospheric pressure and slightly greater than ambient temperature for vessel B in the illustrated embodiment), vessel A moves into the extraction and drying mode while vessel B moves into the pulping and heating mode.

During this phase of operation of the system, the regulating valves 1b and 2 associated with vessel A are closed while the regulating valves 1a, 3 and 4 associated with vessel A are opened. At the same time, the regulating valves 3 and 4 associated with vessel B remain open while the regulating valves 1a, 1b and 2 associated with vessel B are closed. Thus, heat and steam continue to be withdrawn from the interior of vessel A by way of the eductor 234 in order to further reduce the temperature of the biomass within vessel A. At the same time, heat continues to be introduced into the interior of vessel B by way of the heated liquid flowing through the helically arranged liquid transport conduits 138. The manner of operation of vessel A in the extraction and drying mode is the same as the manner of operation of vessel B in the extraction and drying mode as described above. Likewise, vessel B operates in the pulping and heating mode in the same way as vessel A operated in the pulping and heating mode described above.

Once the extraction and drying mode for vessel A is completed and the pulping and heating mode for vessel B is completed, vessel A moves through the door storage mode, the lower and unload mode, the raise vessel mode, and the engage make-up mode in order to discharge the material from the interior of vessel A and move vessel A to a position in which the next batch of material to be treated can be introduced therein. During the aforementioned modes of operation for vessel A, vessel B begins the cooking phase of operation. The system then proceeds through the same series of steps described above.

The aforementioned mode of operation of a system employing two interconnected vessels proceeds in the manner described above with each vessel moving through successive operational phases. Although the system described above and illustrated in FIGS. 26 and 27 includes only two vessels connected to one another, it is understood that such a system could employ more than two vessels. A system employing more than two vessels could also be designed to include two heat exchangers 232 and two eductors 234. Such a system could be advantageous from an operational standpoint since the failure of one of the heat exchangers or one of the eductors would still permit the system to operate through use of the other heat exchanger or eductor.

In addition, while the system has been described in the context of several vessels which proceed through the series of successive operational modes shown in the table of FIGS. 27A and 27B, it is not necessary that the vessels operate in that particular manner. Depending upon various factors such as the type, amount and condition of the waste material being treated, some of the operational modes shown in FIGS. 27A and 27B may be unnecessary. Also, the time duration of the various modes and the operational parameters (e.g., temperature, pressure, moisture content)can be varied to suit the needs of a given treatment process.

In the table shown in FIGS. 27A and 27B, the regulating valves EV, VV are depicted as being open at all times. However, it is understood that those valves EV, VV could be connected to a controller (such as the one shown in FIG. 26a) which would control their operation to achieve certain desired objectives. The valves EV, VV could be controlled to be in either an open condition, a closed condition or a regulating condition for purposes of controlling flow from the steam vent header 226 to the eductor 234 (in the case of the regulating valve VV) and controlling to flow of fluid from the tank 238 to the eductor 234.

The vessels can also be designed to allow chemicals to be introduced into the interior of the respective vessels for purposes of treating the process material. For example, the manifold 92 at the rear cone portion 30 of the vessel can be provided with another inlet to which is connected a line for introducing such chemicals into the vessel interior. The chemicals would then be sprayed into the vessel interior by way of the jets or openings 112 in the cantilevered shaft. Of course, such chemicals can also be introduced through the forward cone end 28 of the vessel when the process material to be treated is being introduced into the interior of the vessel.

As can be appreciated from the foregoing description, the apparatus, system and method according to the present invention are quite advantageous as they allow a wide range of material to be treated. By simply changing the operational parameters, the apparatus, system and method can be specifically tailored to achieve particularized desired results for different types of materials, thereby facilitating separation and sorting efforts.

The present invention is also highly desirable as it does not require high quality water for treatment of the material. Indeed, it is possible to employ water of low grade quality which, through operation of the apparatus and system, is actually increased in quality. In that way, waste water can be used as the water source and subsequently converted to water whose quality is useful for other purposes.

Energy and water conservation represent another advantage of the present invention. By maintaining the system so that heat and steam generated in one of the vessels are subsequently used to heat and raise the moisture content of the material in another vessel, the water and energy requirements for the system can be significantly reduced. Although the system requires the addition of steam from an external source (e.g., a steam generating device can be connected to the steam supply header 224), the amount is significantly less than would otherwise be the case.

The present invention also allows the material to be dried to the extent desired before it is emptied from the vessel. Thus, subsequent separation and sorting efforts can be made easier.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. Apparatus for treating process material through the use of heat and pressure, comprising a hollow vessel having a longitudinal axis and an interior for receiving process material to be treated, said vessel having an opening communicating with the interior of the vessel for allowing introduction of process material to be treated into the interior of the vessel, said vessel having at least one material contacting member secured to and extending inwardly from an inner surface of the vessel for contacting and mixing process material disposed in the interior of the vessel, a cantilevered shaft positioned centrally within the interior of the vessel, said cantilevered shaft having at least one fin extending therefrom for contacting and mixing process material in the interior of the vessel, drive means for rotating the vessel in opposite directions about the longitudinal axis to cause the vessel and the material contacting member to rotate relative to the cantilevered shaft to impart a shearing force to process material in the vessel in order to assist in breaking down the process material, and means for introducing steam into the interior of the vessel to heat and impart moisture to process material in the vessel.

2. Apparatus according to claim 1, wherein said cantilevered shaft is fixed with respect to the vessel so that the shaft remains stationary during rotation of the vessel about its longitudinal axis, and said material contacting member extends helically within the vessel.

3. Apparatus according to claim 2, wherein said material contacting member includes a hollow liquid supply conduit for allowing heated liquid to be helically directed through the vessel towards one end of the vessel in order to raise the temperature in the interior of the vessel and a hollow liquid return conduit for allowing liquid which has been directed through the liquid supply vessel to be helically directed through the vessel towards an opposite end of the vessel to raise the temperature in the interior of the vessel, said liquid supply conduit being in fluid communication with the liquid return conduit adjacent the one end of the vessel.

4. Apparatus according to claim 3, wherein said opposite end of the vessel is open and has a manifold connected thereto, said manifold being fixed relative to the vessel so that the manifold remains stationary during rotation of the vessel about its longitudinal axis, said shaft being fixed to the manifold, said manifold including an inlet for being connected to a source of heated liquid and an outlet for directing liquid out of the vessel, said inlet being in fluid communication with the liquid supply conduit and said outlet being in fluid communication with the liquid return conduit.

5. Apparatus according to claim 1, wherein said means for introducing steam in the interior of the vessel includes said shaft being hollow and is a plurality of openings positioned along the length of the shaft, said hollow shaft being in communication with a source of steam so that steam can be introduced into the interior of the vessel through the holes in the shaft to increase the moisture of the process material in the interior of the vessel.

6. Apparatus according to claim 5, wherein said vessel includes oppositely positioned first and second ends, the second end of the vessel being open and having a manifold connected thereto, said manifold being fixed relative to the vessel so that the manifold remains stationary during rotation of the vessels and said hollow shaft being fixedly connected to the manifold.

7. Apparatus according to claim 1, wherein said opening in said vessel is located at one end of said vessel, said cantilevered shaft extending from an end of the vessel located opposite said one end, said cantilevered shaft extending over less than one-half the length of the vessel.

8. Apparatus according to claim 1, wherein said vessel is mounted on a frame structure, and including means for pivoting the vessel in opposite directions with respect to a horizontal position.

9. Apparatus for treating process material through use of heat and pressure, comprising a vessel having a longitudinal axis and an opening which communicates with an interior of the vessel for allowing process material to be introduced into the interior of the vessel, said vessel including removable closure means for closing the opening in the vessel, means for introducing steam into the interior of the vessel to heat and impart moisture to process material in the vessel, said vessel including at least one hollow fluid transport conduit positioned in the interior of the vessel for transporting heated fluid through the vessel between opposite ends of the vessel, said fluid transport conduit being adapted to allow heated fluid to be conveyed through the vessel without coming into contact with process material in the vessel, rotating means connected to the vessel for rotating the vessel in opposite directions about its longitudinal axis, and heated fluid supply means connected to the fluid transport conduit for supplying heated fluid to the fluid transport conduit to cause an increase in the temperature and pressure within the interior of the vessel as the heated fluid flows through the fluid transport conduit and to dry process material located within the vessel.

10. Apparatus according to claim 9, wherein said fluid transport conduit is fixed to an inner surface of the vessel and is helically disposed within said vessel, and including pivoting means for pivoting the vessel about a pivot axis to raise a forward end of the vessel above a horizontal position and lower the forward end of the vessel below a horizontal position.

11. Apparatus according to claim 9, including at least one fin connected to and extending from the fluid transport conduit to contact process material in the interior of the vessel and facilitate heat transfer.

12. Apparatus according to claim 9, wherein said fluid transport conduit includes a liquid supply conduit for transporting heated fluid towards one end of the vessel and a separate liquid return conduit for transporting heated liquid from the liquid supply conduit towards an opposite end of the vessel, said liquid supply conduit being connected to said liquid return conduit adjacent the one end of the vessel.

13. Apparatus according to claim 9, wherein said vessel is provided with a plurality of separate fluid transport conduits for transporting fluid through the vessel, said plurality of fluid transport conduits each being helically disposed within the vessel.

14. Apparatus according to claim 9, wherein said heated fluid supply means includes a heat exchanger.

15. Apparatus according to claim 9, wherein said heated fluid supply means supplies heated oil to the fluid transport conduit.

16. System for treating process material through the use of steam, comprising
  a first vessel having an interior and an opening for allowing process material to be introduced into the interior of the first vessel;
  a first steam supply line connected to the first vessel through which steam can flow into and from the interior of the first vessel;
  a second vessel having an interior and an opening for allowing process material to be introduced into the interior of the second vessel;
  a second steam supply line connected to the second vessel through which steam can flow into and from the interior of the second vessel;
  each of said first vessel and said second vessel being operable in a first operational mode and a second operational mode;
  means for allowing steam in the interior of the first vessel to be introduced into the interior of the second vessel when the first vessel is in the second operational mode and the second vessel is in the first operational mode, and for allowing steam in the interior of the second vessel to be introduced into the interior of the first vessel when the second vessel is in the second operational mode and the first vessel is in the first operational mode.

17. System according to claim 16, wherein said means for allowing steam to be introduced includes a steam supply header fluidly connecting the first steam supply line to the second steam supply line, valve means associated with the first and second steam supply lines to control the flow of steam therethrough, and control means operatively associated with said valve means for controlling opening and closing of said valve means.

18. System according to claim 16, wherein said means for allowing steam to be introduced includes a steam supply header fluidly connecting the first steam supply line to the second steam supply line, a first supply valve disposed in the first steam supply line, and a second supply valve disposed in the second steam supply line.

19. System according to claim 18, including a first steam vent line fluidly connected to the first vessel for venting steam from the interior of the first vessel and a second steam vent line fluidly connected to the second vessel for venting steam from the interior of the second vessel, said means for allowing steam to be introduced including a first fluid connecting line which fluidly connects the first steam supply line to the first steam vent line and a second fluid connecting line which fluidly connects the second steam supply line to the second steam vent line.

20. System according to claim 18, wherein said means for allowing steam to be introduced includes a first vent valve disposed in the first steam vent line, a second vent valve disposed in the second steam vent line, a first connecting valve disposed in the first fluid connecting line, and a second connecting valve disposed in the second fluid connecting line.

21. System according to claim 16, including a first steam vent line connected to the first vessel for venting steam from the interior of the first vessel, a second steam vent line connected to the second vessel for venting steam from the interior of the second vessel, and means fluidly connected to the first steam vent line and the second steam vent line for condensing steam vented from the interior of the first and second vessels.

22. System according to claim 21, including a steam vent header fluidly connected to the first steam vent line and the second steam vent line, said means for condensing steam including an eductor fluidly connected to the steam vent header.

23. System according to claim 16, including a heat exchanger for heating liquid, means for conveying heated liquid from the heat exchanger through the interior of the first and second vessels and for returning liquid to the heat exchanger.

24. System according to claim 23, wherein said means for conveying heated liquid through the interior of the first and second vessels includes a plurality of helically arranged fluid transport conduits extending through each of the respective first and second vessels, each fluid transport conduit including a liquid supply conduit extending from one end of the respective vessel toward an opposite end and a liquid return conduit connected to the liquid supply conduit and extending from the opposite end of the respective vessel toward the one end, said liquid supply conduit being in fluid communication with the liquid return conduit adjacent the opposite end of the respective vessel.

* * * * *